US009817620B2

(12) United States Patent
Bozier

(10) Patent No.: US 9,817,620 B2
(45) Date of Patent: Nov. 14, 2017

(54) PREDICTIVE OBJECT-SEQUENCE CACHING FROM PRIOR PAGE CONTENT

(71) Applicant: CANON KABUSHIKI KAISHA, Tokyo (JP)

(72) Inventor: Rolfe Craig Bozier, Hornsby Heights (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/966,944

(22) Filed: Dec. 11, 2015

(65) Prior Publication Data

US 2016/0179445 A1 Jun. 23, 2016

(30) Foreign Application Priority Data

Dec. 19, 2014 (AU) ................................ 2014277808

(51) Int. Cl.
*G06F 3/12* (2006.01)
*G06K 15/02* (2006.01)

(52) U.S. Cl.
CPC .......... *G06F 3/1248* (2013.01); *G06F 3/1298* (2013.01); *G06K 15/1849* (2013.01); *G06K 15/1888* (2013.01)

(58) Field of Classification Search
CPC . G06F 3/1248; G06F 3/1298; G06K 15/1849; G06K 15/1813
See application file for complete search history.

(56) References Cited

U.S. PATENT DOCUMENTS

| 8,099,555 B2 | 1/2012 | Williamson |
| 8,526,036 B2 | 9/2013 | Bellert et al. |
| 2002/0149792 A1 | 10/2002 | Gauthier et al. |
| 2005/0044494 A1 | 2/2005 | Barnes et al. |

(Continued)

FOREIGN PATENT DOCUMENTS

AU 2012-258406 A1 6/2014

OTHER PUBLICATIONS

Tridgell et al., "The rsync algorithm", Joint Computer Science Technical Report Series, Jun. 18, 1996, pp. 1-8, Department of Computer Science, Faculty of Engineering and Information Technology, and the Computer Sciences Laboratory, Research School of Information Sciences and Engineering, The Australian National University, <http://cs.anu.edu.au/techreports/>.

*Primary Examiner* — Iriana Cruz
(74) *Attorney, Agent, or Firm* — Canon USA, Inc. I.P. Division

(57) ABSTRACT

A reusable sequence of display list objects is determined, by extending the repeated sequence to further consecutive display list objects, each occurrence of the reusable sequence being associated with a z-order position in a corresponding display list. At least one display list is divided, at the z-order position of the reusable sequence in the display list, into a plurality of z-bands including a reusable z-band for the determined reusable sequence. A reusable intermediate graphical representation is generated for the determined reusable sequence and a further intermediate graphical representation for at least one other z-band. The further intermediate graphical representation is merged with the reusable intermediate graphical representation in accordance with an order of the z-bands. The page description language (PDL) document is rendered using the merged representations.

17 Claims, 14 Drawing Sheets

(56) References Cited

U.S. PATENT DOCUMENTS

2011/0157637 A1* 6/2011 Kimura .............. G06K 15/1849
  358/1.15
2013/0286044 A1 10/2013 Puckett
2015/0145872 A1* 5/2015 Morrison .................. G06F 9/46
  345/505

* cited by examiner

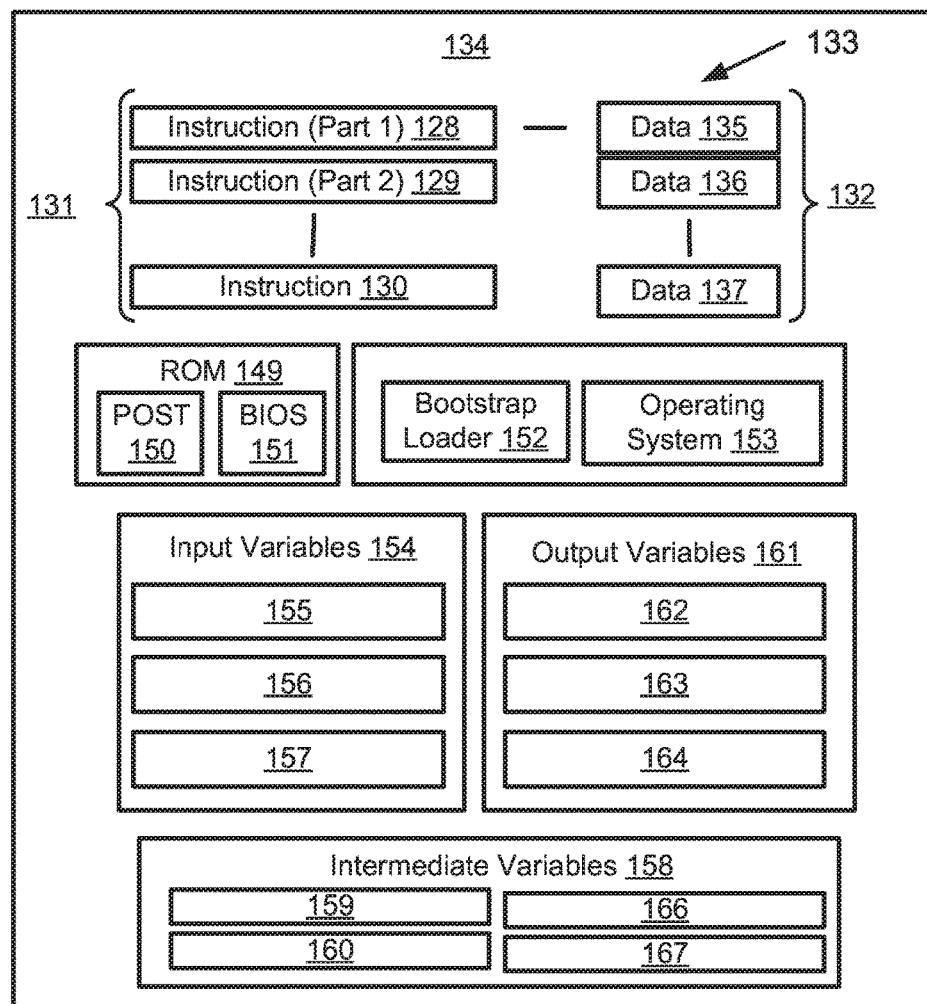
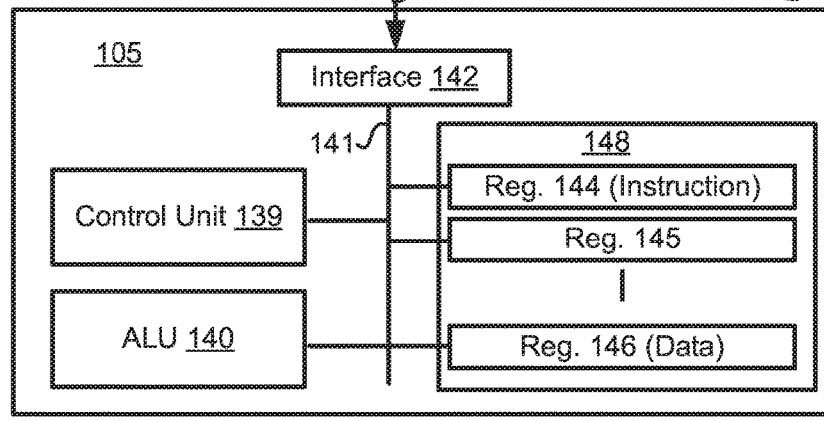
Fig. 1B

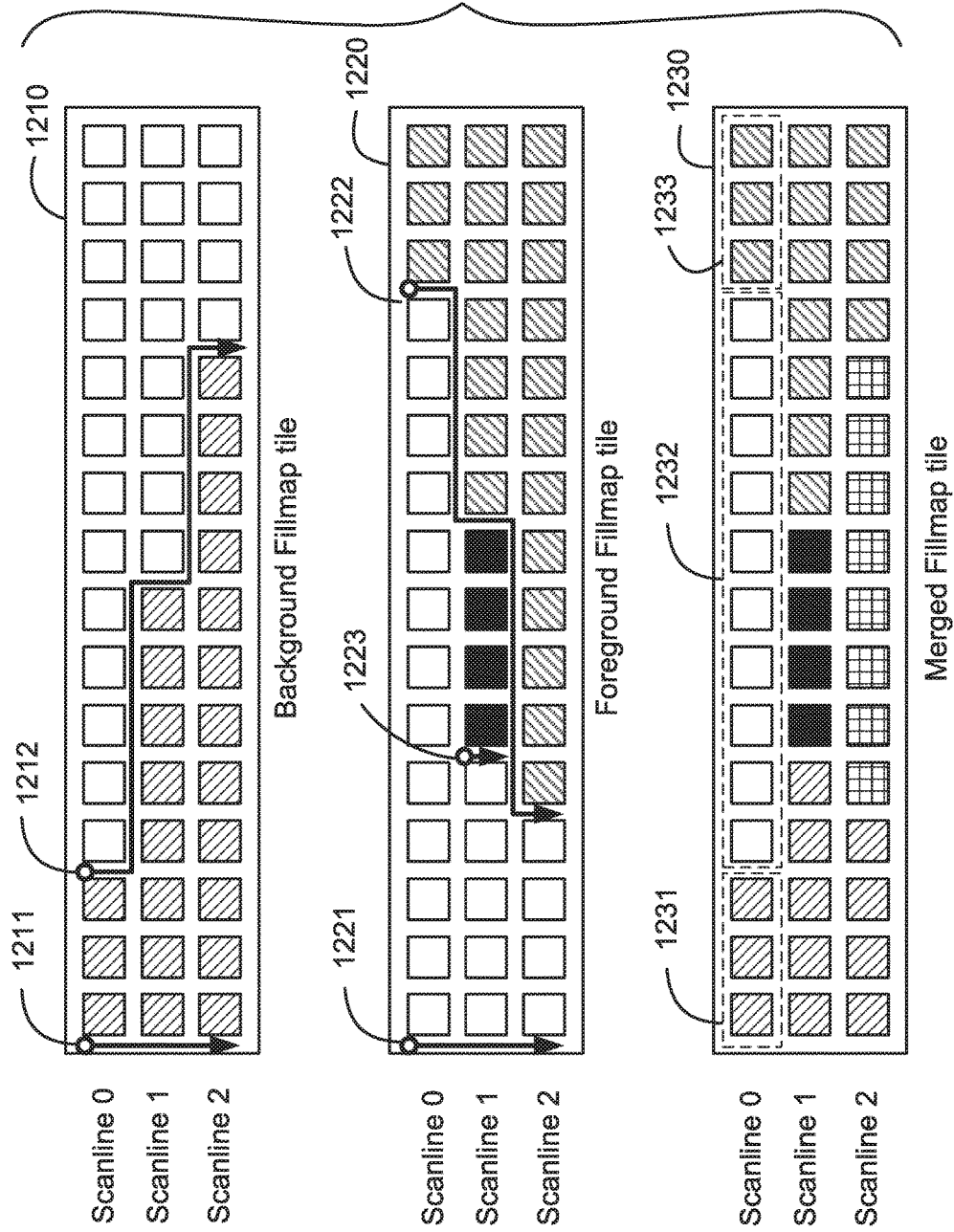

PREDICTIVE OBJECT-SEQUENCE CACHING FROM PRIOR PAGE CONTENT

REFERENCE TO RELATED PATENT APPLICATION(S)

This application claims the benefit under 35 U.S.C. §119 of the filing date of Australian Patent Application No. 2014277808, filed Dec. 19, 2014, hereby incorporated by reference in its entirety as if fully set forth herein.

TECHNICAL FIELD

The present invention relates generally to printing systems and, in particular, to a printing system that uses cached intermediate format print to increase performance. The present invention also relates to a method, system and apparatus of rendering a document. The present invention also relates to a computer program product including a computer readable medium having recorded thereon a computer program for rendering a document.

BACKGROUND

Many printing systems accept a high-level description of the output in the form of a page description language (PDL) and convert the high-level description to a pixel-based representation, suitable for sending to a print engine. Examples of such printing systems include server-based raster image processors (RIPs) that send their output to a file or a printer. Other examples of such printing systems include standalone embedded printers and split systems where a portion of processing is performed in a driver or server, and the remaining processing is performed on a low-capability printer device.

One processing path for print data is for the print data to be converted from PDL format to a display list (DL) which contains drawing commands. The display list is then converted to one or more intermediate formats, before finally being rendered to pixels. An advantage of an intermediate format is that the intermediate format is significantly smaller than the pixel output, and yet still allows analysis and processing of page content.

Many print documents contain some content that is repeated over many pages. For example, corporate PowerPoint™ presentations often have common headers and footers repeated on each page. Another example is a mail-merged letter or brochure where content is substantially duplicated over multiple pages with only personal details being different. The overhead of repeated processing of the same content multiple times can lead to unnecessary reduction in performance.

SUMMARY

It is an object of the present invention to substantially overcome, or at least ameliorate, one or more disadvantages of existing arrangements.

According to one aspect of the present disclosure, there is provided a method for rendering a page description language (PDL) document, the method comprising:

receiving a plurality of display lists, each display list comprising a plurality of display list objects;

determining a repeated sequence of a predetermined number of consecutive display list objects across the display lists;

determining a reusable sequence of display list objects, for the repeated sequence, by extending the repeated sequence to further consecutive display list objects, each occurrence of the reusable sequence being associated with a z-order position in a corresponding display list;

subdividing at least one display list, at the z-order position of the reusable sequence in said display list, into a plurality of z-bands including a reusable z-band for the determined reusable sequence;

generating a reusable intermediate graphical representation for the determined reusable sequence and a further intermediate graphical representation for at least one other z-band;

merging said further intermediate graphical representation with the reusable intermediate graphical representation in accordance with an order of said z-bands; and rendering the page description language (PDL) document using the merged representations.

According to another aspect of the present disclosure, there is provided a system for rendering a page description language (PDL) document, the system comprising:

a memory for storing data and a computer program;

a processor coupled to the memory for executing said program, said program comprising instructions for:

receiving a plurality of display lists, each display list comprising a plurality of display list objects;

determining a repeated sequence of a predetermined number of consecutive display list objects across the display lists;

determining a reusable sequence of display list objects, for the repeated sequence, by extending the repeated sequence to further consecutive display list objects, each occurrence of the reusable sequence being associated with a z-order position in a corresponding display list;

subdividing at least one display list, at the z-order position of the reusable sequence in said display list, into a plurality of z-bands including a reusable z-band for the determined reusable sequence;

generating a reusable intermediate graphical representation for the determined reusable sequence and a further intermediate graphical representation for at least one other z-band;

merging said further intermediate graphical representation with the reusable intermediate graphical representation in accordance with an order of said z-bands; and rendering the page description language (PDL) document using the merged representations.

According to still another aspect of the present disclosure, there is provided an apparatus for rendering a page description language (PDL) document, the apparatus comprising:

means for receiving a plurality of display lists, each display list comprising a plurality of display list objects;

means for determining a repeated sequence of a predetermined number of consecutive display list objects across the display lists;

means for determining a reusable sequence of display list objects, for the repeated sequence, by extending the repeated sequence to further consecutive display list objects, each occurrence of the reusable sequence being associated with a z-order position in a corresponding display list;

means for subdividing at least one display list, at the z-order position of the reusable sequence in said display list, into a plurality of z-bands including a reusable z-band for the determined reusable sequence;

means for generating a reusable intermediate graphical representation for the determined reusable sequence and a further intermediate graphical representation for at least one other z-band;

means for merging said further intermediate graphical representation with the reusable intermediate graphical representation in accordance with an order of said z-bands; and means for rendering the page description language (PDL) document using the merged representations.

According to still another aspect of the present disclosure, there is provided a computer readable medium having a computer program stored thereon for rendering a page description language (PDL) document, the program comprising:

code for receiving a plurality of display lists, each display list comprising a plurality of display list objects;

code for determining a repeated sequence of a predetermined number of consecutive display list objects across the display lists;

code for determining a reusable sequence of display list objects, for the repeated sequence, by extending the repeated sequence to further consecutive display list objects, each occurrence of the reusable sequence being associated with a z-order position in a corresponding display list;

code for subdividing at least one display list, at the z-order position of the reusable sequence in said display list, into a plurality of z-bands including a reusable z-band for the determined reusable sequence;

code for generating a reusable intermediate graphical representation for the determined reusable sequence and a further intermediate graphical representation for at least one other z-band;

code for merging said further intermediate graphical representation with the reusable intermediate graphical representation in accordance with an order of said z-bands; and code for rendering the page description language (PDL) document using the merged representations.

Other aspects of the invention are also disclosed.

BRIEF DESCRIPTION OF THE DRAWINGS

One or more embodiments of the invention will now be described with reference to the following drawings, in which:

FIGS. 1A and 1B form a schematic block diagram showing a monolithic printing system, upon which the various arrangements described can be practiced;

FIG. 12 shows an example of fillmap tile merging.

DETAILED DESCRIPTION INCLUDING BEST MODE

Figure 1A:
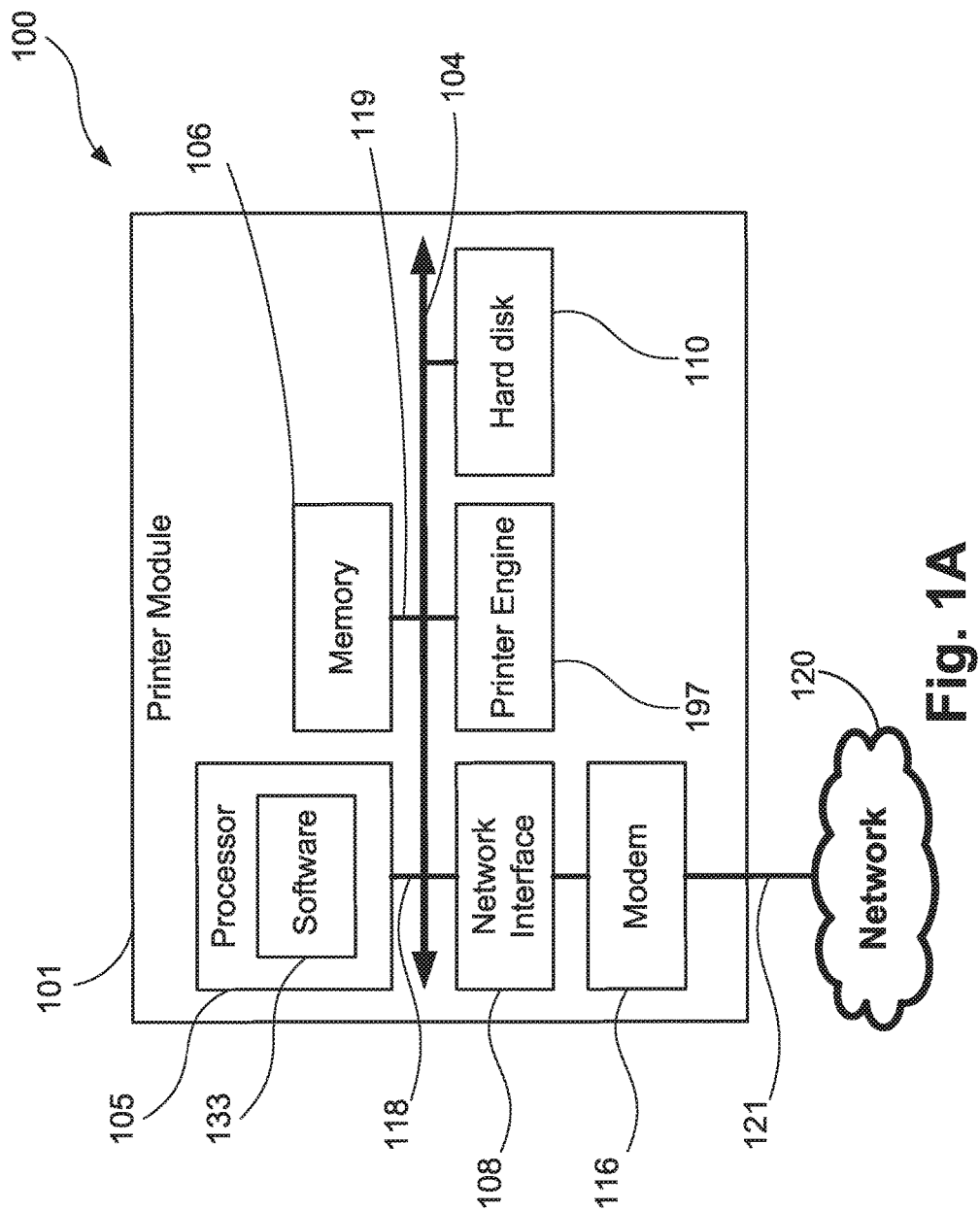

Where reference is made in any one or more of the accompanying drawings to steps and/or features, which have the same reference numerals, those steps and/or features have for the purposes of this description the same function(s) or operation(s), unless the contrary intention appears.

Print rendering systems are normally provided with a source document in a page description language, such as Portable Document Format (PDF) developed by Adobe Systems Inc. Such print rendering systems generate pixel data output that is suitable for sending the pixel data to printer hardware for drawing on an output medium.

A print rendering system may for example take drawing requests or instructions from the PDL and render the drawing instructions directly into a full-page frame-buffer. One method for rendering drawing instructions directly into a full-page frame-buffer is known as Painter's Algorithm. Alternatively, the drawing instructions can be rendered by converting the drawing instructions to one or more intermediate formats. The present disclosure relates to printing systems that use an intermediate format, known as a fillmap data structure, or simply a fillmap.

FIGS. 1A and 1B form schematic block diagram showing a monolithic printing system, upon which the various arrangements described can be practiced.

As seen in FIG. 1A, the system 100 comprises a printer module 101. The module 101 comprises at least one processor unit 105, and memory unit 106. For example, the memory unit 106 may be formed by a combination of memory types including semiconductor read only memory (ROM), non-volatile random access memory (RAM) and volatile RAM. Other storage devices such as a hard disk drive (HDD) 110 are also provided.

The system 100 comprises an input/output (I/O) network interface 108 for an external Modulator-Demodulator (Modem) transceiver device 116. The modem 116 may be used by the printer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120. In some implementations, the modem 116 may be incorporated within the interface 108.

The components 105 to 110 typically communicate via an interconnected bus 104 and in a manner that results in a conventional mode of operation of the system 100. For example, the processor 105 is coupled to the bus 104 using a connection 118. Likewise, the memory 106 is coupled to the bus 104 by a connection 119.

Methods of rendering described below may be implemented using the printing system 100 wherein the processes of FIG. 4, to be described, may be implemented as one or more software application programs 133 executable within the system 100. In particular, the steps of the described methods may be effected by instructions 131 (see FIG. 1B) in the software 133 that are carried out within the system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs, or alternatively may be read by the user from the networks 120. Still further, the software 133 can also be loaded into the module 101 from other computer readable media. Computer readable storage media refers to any non-transitory tangible storage medium that provides recorded instructions and/or data to the printing system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the printing system 100. Examples of transitory or non-tangible computer readable transmission media that may also participate in the provision of software, application programs, instructions and/or data to the printing system 100 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon a display of the system 100.

FIG. 1B is a detailed schematic block diagram of the processor 105 and a "memory" 134. The memory 134 represents a logical aggregation of all the memory modules (including the HDD 110) that can be accessed by the printing system 100 in FIG. 1A.

When the printer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the printing system 100 to ensure proper functioning and typically checks the processor 105, the memory 134 (110, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (110, 106) to ensure that each process or application running on the printer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the printing system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across the network 120, data retrieved from one of the storage devices 106, 110. The execution of a set of the instructions may in some cases result in output of data. Execution may also involve storing data or variables to the memory 134.

The disclosed rendering arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

- a fetch operation, which fetches or reads an instruction 131 from a memory location 128, 129, 130;
- a decode operation in which the control unit 139 determines which instruction has been fetched; and
- an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 4:
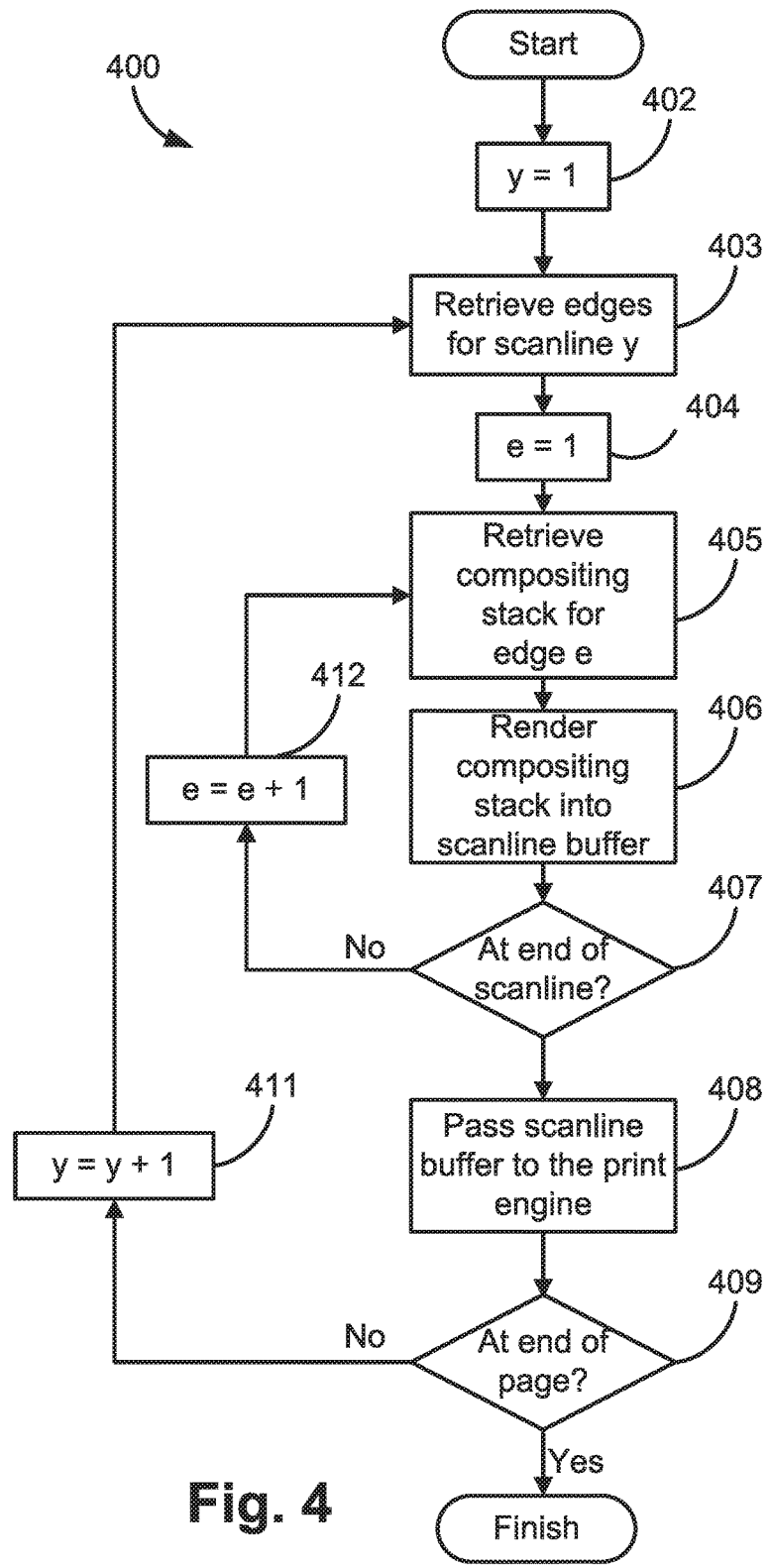
FIG. 4 is a flow diagram showing a method for rendering a fillmap to pixel data.

Each step or sub-process in the processes of FIG. 4 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The printing system 100 accepts PDL data from a document creation application (e.g., a word processor or web browser) and converts the PDL data to an intermediate graphical representation (or "intermediate format data"), known as a fillmap. The system 100 renders the fillmap data to output pixel data that is passed to a printer engine 197 for hard copy reproduction. Alternatively, the print data can be stored to the hard drive 110 for later output.

As described above, the software 133 is typically stored in the HDD 110 or the memory 106, which is also used for temporary storage of data during the processing performed within the system 100. As described above, the memory 106 may have a combination of memory types. The memory 106 may include read-only memory (ROM), non-volatile random-access memory (RAM) and volatile RAM. Often, for notebook, desktop or server (e.g. cloud) computing implementations of the system 100, the non-volatile RAM may be formed by magnetic disk drive or similar storage device.

For highly portable implementations, such as where the module 101 is a smartphone or tablet device, or the like, the non-volatile RAM is typically formed by silicon devices implementing a so-called solid state hard drive (SSHD). In such a portable implementation, the memory 106 includes or is formed by non-transitory tangible computer readable storage media within which the software 133, at least, may be stored.

The described methods of rendering will described with reference to the printing system 100. However, as described above, the methods of rendering described below may also be implemented using printing systems with different structures.

Figure 2:
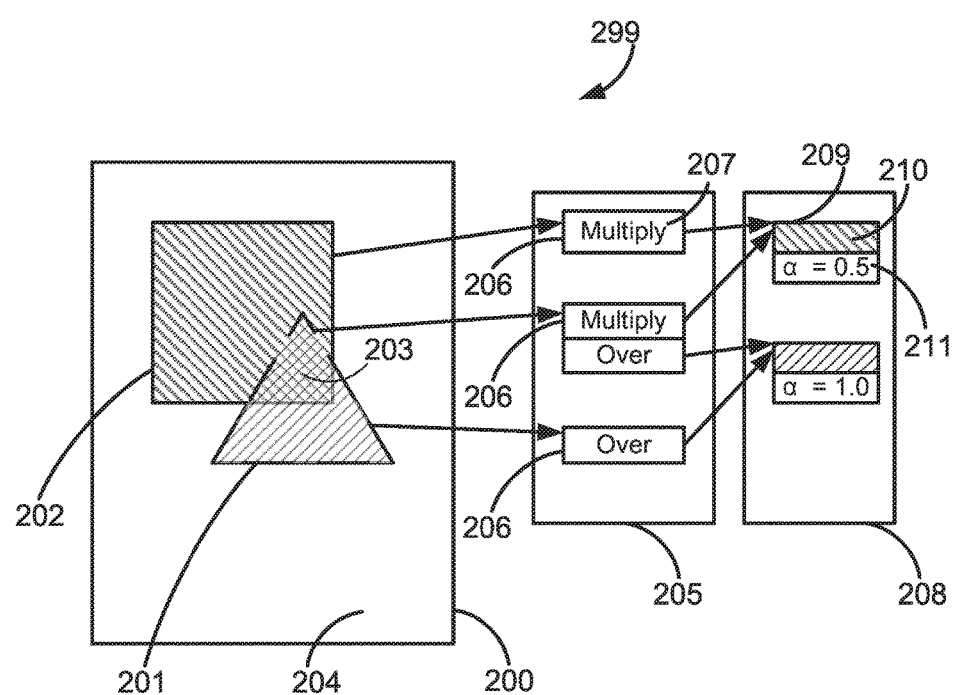
FIG. 2 is the structure of an example fillmap.

A fillmap describes the content of a single page in a print document. The data structure of a fillmap 299 is shown in FIG. 2. In the fillmap 299, the content of a page 200 to be reproduced by printing is divided into non-overlapping regions 201, 202, 203, including background regions 204. Each region of a fillmap is an area containing a particular combination of contributing PDL objects. The extent of each region is described by edges that are aligned with a pixel grid able to be printed by the print engine 197. The content of each region 201, 202 and 203 is defined by a set of compositing stacks 205. Each compositing stack is an ordered list of level appearances 206, each of which corresponds to an object that contributes to the appearance of the corresponding region. Each level appearance 206 references either a single fill or a group of fills in a fill store 208, generally formed within the memory 106. The level appearance 206 also defines one or more compositing operations 207 that are used to draw the group or object on the underlying objects.

In the example of FIG. 2, the compositing operations Multiply and Over are used by the three level appearances 206. A fill 209 describes the colour 210 and alpha 211 for the pixels of the corresponding non-overlapping region. The collection of fills 208 describes the regions on the page 200. The collection of fills 208, the compositing stacks 205 and the regions 201, 202 and 203 form the fillmap 299 for the page 200. Fills include flat regions of colour, linear and radial gradients and images. For example, the fill 209 may consist of a red colour and a level appearance 206 could composite the red fill on an underlying object using the "Multiply" blend mode, so that the compositing stack 205 would comprise the red level appearance along with the level appearances of the underlying objects.

In the example of FIG. 2, there is no level appearance illustrated for the background region 204. The region 204 can be assumed to be the implicit destination of the lowest compositing operation in each stack 205. In other implementations, an explicit entry representing the background region 204 may be inserted in the compositing stack 205. As shown in FIG. 2, the structure of the fillmap 299 may be considered an intermediate format which uses non-overlapping regions that reference compositing stacks that in turn reference fills for a page where, edges associated with objects are pixel-aligned.

The fillmap 299 may be used by a printing system, such as the printing system 100, as an intermediate graphical representation. The fillmap 299 may also be referred to as an "intermediate format". The printing system 100 is a fillmap-based print rendering system.

Figure 3A:
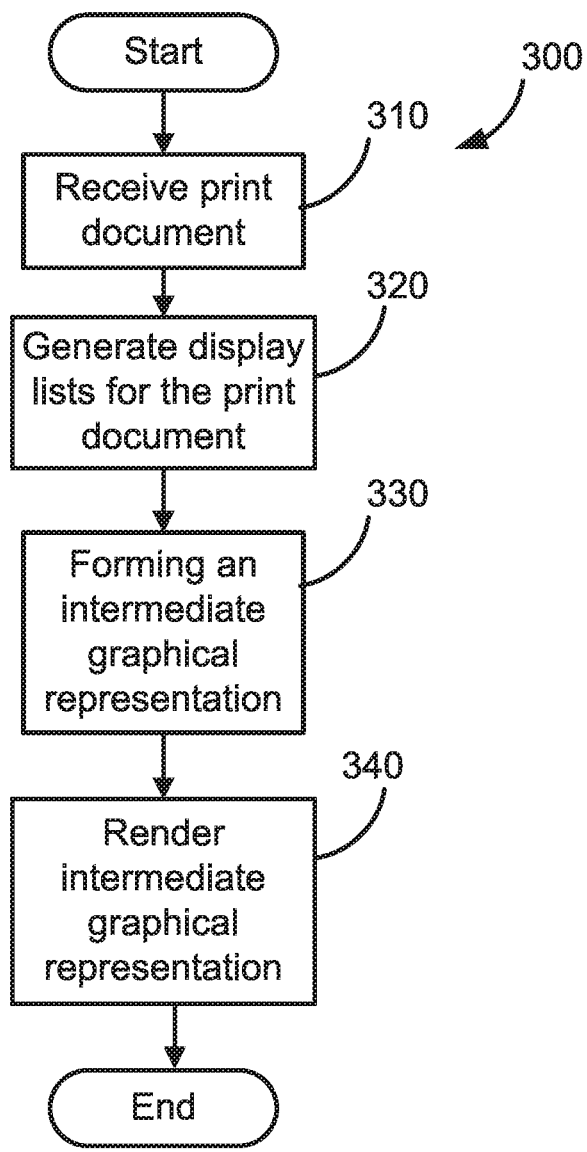
FIG. 3A is a schematic block diagram showing a method of rendering a document.

A method 300 of rendering a page of document described in a page description language (PDL), using the system 100, will now be described with reference to FIG. 3A. The method 100 may be implemented as one or more software code modules of the software application program 133, resident in the hard disk drive 110 of the printer module 101, and being controlled in its execution by the processor 105. The method 300 will described with reference to the printing system 100 and the printing module 101.

Figure 3B:
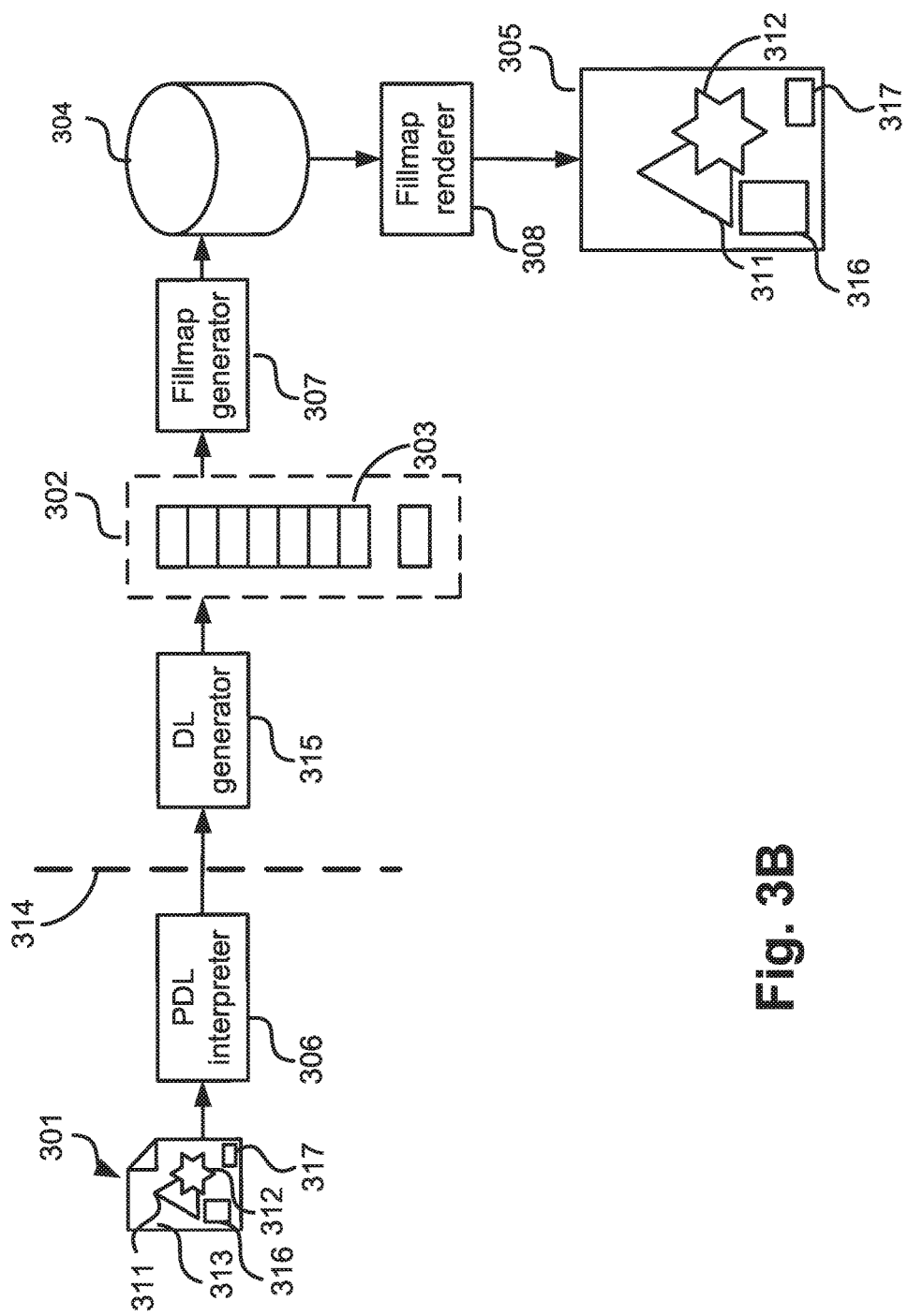
FIG. 3B is a diagram showing the flow of data from a page description language to output pixels.

The method 300 will be described by way of example with reference to a document 301 shown in FIG. 3B. FIG. 3B shows example high-level processing flow of the system 100 in rendering the document 301.

The method 300 begins at a receiving step 310, where a print document 301 is received by the system 100 under execution of the processor 105. FIG. 3B shows a page 313 of the print document 301. The print document 301 may comprise a plurality of such pages. The page 313 is provided to the system 100, for example, from the memory 106. The page 313 is described by page description language (PDL) data. Examples of page description languages include portable document format (PDF), PostScript™ and Open XML Paper Specification (XPS). As seen in FIG. 3B, the page 313 comprises a plurality of graphical objects 311, 312, 316 and 317. One or more of the graphical objects 311, 312 may be images.

At processing step 320, the page 313 is read and processed by a PDL interpreter module (PDLi) 306 under execution of the processor 105. The PDL interpreter module (PDLi) 306 converts content of the page 313 into a sequence of drawing instructions which may be stored in the memory 106. The PDL interpreter module (PDLi) 306 may be implemented as one or more software code modules of the software application program 133. The drawing instructions are passed from the PDL interpreter module (PDLi) 306 to the Display List (DL) generator 315, via a drawing interface 314. The drawing instructions are accumulated in one or more z-ordered display lists 302. An entry 303 in the display list 302 can represent a drawing instruction. Generation of the display lists at step 320 will be described in detail below.

Then at forming step 330, the display list 302 is then passed to a fillmap generator module 307 which is used for forming an intermediate graphical representation 304 of the page 313. The fillmap generator module 307 may be implemented as one or more software code modules of the software application program 133. The fillmap generator module 307 converts the data of the display list 302 into an intermediate graphical representation in the form of a fillmap 304 comprising fillmap data. As described in detail below, the fillmap 304 is formed based on image metadata for the images of the page 313. As also described, the fillmap 304 is subdivided into a plurality of tiles.

Upon the fillmap generator module 307 receiving all of the plurality of display lists 302 for the page 313 of the print document 301 and the fillmap 304 has been formed, the fillmap 304 is passed to a fillmap renderer module 308, at rendering step 340. The fillmap renderer module 308 may be implemented as one or more software code modules of the software application program 133. At step 340, the intermediate graphical representation in the form of the fillmap 304 is rendered into a page of output pixel data 305. The page of output pixel data 305 may be passed to a print engine for hard-copy reproduction. A method 400 of rendering the fillmap 340 to pixel data, as executed at step 340, will be described with reference to FIG. 4. As described below, the document 301 may be rendered using merged fillmaps.

The method 300 is described in more detail in the following sections.

Display List Generation

The generation of the display lists, as performed by the PDLi module 306 at step 320, will now be described. In the example of FIG. 3B, the PDL interpreter module (PDLi) 306, under execution of the processor 105, takes a sequence of drawing instructions from the PDL document (e.g., page 313) and converts the drawings instructions into a list that can be manipulated. The available types of drawing instructions are independent of the page description language (PDL) used to describe the page 313. The independence of the drawing instructions allows different PDLi implementations to provide data to the same printing system, such as the printing system 100. Examples of the drawing instructions include:

(i) instructions providing global information about page content for the page 313. The global information may include, for example, page size, page affine transformation, colour space information and device resolution;

(ii) instructions drawing an object on a page by providing data specifying shape, stroking and/or filling content for drawing an object on the page 313. The data may also include optional clip data of the object, and a compositing operation that defines how the object composites with any objects underneath the object in the z-order of the page 313; and (iii) instructions providing a set of properties associated with a group of objects, where the set of properties apply to all member objects of the group.

As described above in the example of FIG. 3B, the print document is in the form of a page 313. Each graphical object (e.g., 311, 312) that is drawn onto the page 313 is added to a display list at step 320, so that each display list may comprise one or more of the graphical objects (or "display list objects"). Each display list entry contains information about the shape, colour, and the compositing operation of the object. The compositing operation specifies how the object should be drawn over any underlying objects on the page 313.

The object shape can be defined by a set of paths or glyphs, where a glyph is a symbol or character. The shape of the object can be stroked, filled, or both stroked and filled. Similarly, an object can have optional clipping information, which is also supplied by a set of paths or one or more glyphs. The clipping information restricts the visibility of a clipped object. In one arrangement of the described printing methods, clipping boundaries may be represented as display list entries that refer to the display list entries which the clipping boundaries clip. In an alternative arrangement, each clipped display list entry has a reference to the clipping boundaries that clip the clipped display list entry.

The colour appearance of a filled area or stroked path is provided by a "fill definition". There are various types of fills, including:

(i) a region of solid colour, or "flat";

(ii) a region of colour interpolated between two geometric points and associated colours, known as a 2-point gradient;

(iii) a region of colour interpolated between three geometric points and colours associated with the geometric points, known as a 3-point gradient;

(iv) a region of colour interpolated between more than two collinear geometric points and colours associated with the collinear geometric points, known as a multi-stop gradient;

(v) a region of colour interpolated between two geometric circles and colours associated with the geometric circles, known as a radial gradient; and (vi) a region of colour defined by an image, where the image can be a single instance or can be repetitively tiled across and down a page, such as the page 301, at any angular orientation.

Fillmap Generation

The conversion of the display list 302 into an intermediate graphical representation in the form of the fillmap 304, as performed by the fillmap generator module 307 at step 330, will now be described. The fillmap 307 is generated by processing display list objects in increasing Y-order (i.e. from the top of the page 313 to the bottom).

A fillmap is a device-resolution data structure. That is, the spatial data (i.e., the edges that delineate the page 313 into regions) within a fillmap are aligned with the pixel grid used by the print engine. Consequently, a fillmap created for a specific device resolution (e.g. 600 dpi) cannot be rendered on a print device which has a different resolution (e.g. 1200 dpi). The data within a fillmap can cover the top-left printer device pixel through to the bottom-right pixel. Alternatively, the fillmap may only be defined for part of a page, if the content does not cover the whole page.

Before processing, all objects in the display list 302 are sorted in Y-increasing order. That is, entries in the list 302 are ordered so that objects that start nearer the top of the page 313 appear before objects that appear further down the page 313. The shape information for each entry in the display list 302 is expanded into one or more sub-paths. The shapes for a text object are first obtained from a font engine before being placed into the display list 302.

The generation of the fillmap 304 starts at a first scan line in the page 313. Processing continues one scan line at a time until all the objects in the display list 302 have been processed, or the bottom of the page 313 is reached. At each scan line, the display list 302 is consulted. Any sub-paths that start on the current scan line are divided into Y-monotonic edges. Y-monotonic edges are edges that only increase in the Y direction (i.e. edges in the fillmap 302 do not decrease in Y direction). Any edges that start on the current scan line will be expanded into a set of straight-line vectors. Curved edges are vectorized such that the difference between the curved edge and the resultant straight-line vectors is below the resolution of an output device such as the module 101.

Once an edge has been converted into vectors, a scan conversion process is performed on the vectors. Scan conversion is the process of converting vectors in the coordinate system of the page 313 to fillmap edges that are aligned with the pixel grid of the output device. The determination of the pixel edges is based on the current pixel placement rule, which defines the pixels that are considered to be "inside" a shape. Two examples of pixel placement rules are as follows:

(i) grid intersect rule: where boundary pixels are considered inside a shape if the centre of the pixel is inside the shape; and (ii) area intersect rule: where boundary pixels are considered inside a shape if the boundary pixel touches any part of the shape.

Scan-conversion of each vector begins when fillmap generation processing reaches the first scan line which the vector can affect. The vector is then tracked for each scan line until processing reaches the final scan line which the vector can affect. For each scan line, the position of the intersection between the vector and the scan line is calculated. There are various scan-conversion methods which can be used, including Bresenham's algorithm, or solving the intersection in fixed or floating point calculations.

Each scan line is processed to generate a set of x-intercepts, corresponding to the positions where each pixel-aligned edge has been created from a vector that intercepts the scan line. Each x-intercept is labelled with a "z-level" (i.e., the ordering of the objects as the objects are painted on the page 313), a "direction" (i.e., indicating whether the edge is an enabling or disabling edge) and a level appearance reference. There can be multiple pixel-aligned edges at the same x-intercept.

Once all the x-intercepts for a scan line have been determined, level processing is performed. The purpose of the level processing is to create a set of pixel-aligned fillmap edges corresponding to the x-intercepts. Each fillmap edge corresponds to the one or more x-intercepts at the same pixel. Associated with each fillmap edge is the set of level appearances that are active at the position of the edge. The set of level appearances is ordered by z-level, and is known as a "compositing stack". A compositing stack fully describes the colour and alpha appearance of a region associated with the edge.

A set of fillmap edges is determined for the scan line. The above scanline processing is repeated on the following scan lines. As processing proceeds down the page, the sets of edges for each scan line may be joined across the scan lines, leading to the creation of two-dimensional regions on the page 313, denoted by the fillmap edges. By the end of the page 313, the entire content of the page 313 has been converted to a set of device pixel-aligned regions, each of which references a compositing stack that describes the content. To reduce memory usage and to facilitate efficient rendering, the set of edges can be partitioned into tiles, which are then compressed separately and stored (e.g., in the memory 106) for later retrieval.

Fillmap Rendering

As described above, the regions in a fillmap are delineated by edges that are aligned with the pixel grid of the print engine 197. As a result, by the time rendering is performed, all output pixels have been assigned to a compositing stack. Therefore, no geometric calculations are needed to determine the source of the colour information for the output pixels. The method 400 of rendering the fillmap 340, as performed by the renderer module 308 at step 340 will now be described with reference to FIG. 4. The method 400 may be implemented as one or more software code modules of the software application program 133, resident in the hard disk drive 110 of the printer module 101, and being controlled in its execution by the processor 105.

The method 400 is executed when the fillmap 340 is ready to be rendered. The fillmap 340 is rendered one scan line at a time, starting from the top of the page 313.

The method 400 begins at initialising step 402, where a loop is initialised by setting a row counter, y, to a first row (i.e., y=1). At retrieving step 403, the edges that intersect the current scan line are retrieved from a fillmap edge store configured, for example, within memory 206. The scan line is rendered by considering each edge in turn from left to right, and generating pixel data for the span between a current edge and a next edge (or the end of the scan line).

The method 400 continues to initialising step 404, where a loop is initialised by setting an edge counter, e, to a first value (i.e., e=1). At a compositing stack retrieving step 405, the compositing stack associated with the edge, e, is retrieved from a compositing stack store configured, for example, within the memory 106. The compositing stack retrieved at step 406 is evaluated for each pixel of the edge to create pixel data for the edge, as will be described in more detail below. The pixel data for the edge is rendered into a pixel buffer configured within the memory 106.

At decision step 407, if there are more edges in the scan line, then the method proceeds to step 412. The edge index, e, is incremented at step 412 (i.e., e=e+1) and processing loops back to step 405 where the compositing stack for a next edge is read at step 405. Otherwise, if there are no more edges in the scan line, then the method 400 has finished rendering all the pixels for the current scan line and the method 400 proceeds to passing step 408. At step 408, the pixel buffer is passed to the print engine 197 to be printed on the page 313.

If there are more scan lines in the fillmap 340 to be rendered at decision step 409, then the method 400 proceeds to incrementing step 411. At step 411, the row counter, y, is incremented (i.e., y=y+1) and processing loops back to retrieve step 403 where the edges that intersect scan line, y, are retrieved. Otherwise, the method 400 has finished rendering the fillmap 340.

The method 400 above describes rendering scan lines one at a time. There are other methods of processing fillmap data that may be used in different printing systems. For example, the scan lines may be rendered in horizontal page-width strips, and then passed to the print engine 197. Rendering the scan lines in horizontal page-width strips, allows the print engine 197 to process a strip of data while the next strip is being rendered. Alternatively, the page 313 may be divided into vertical page-height strips or tiles and each strip or tile rendered as a single entity, where dividing the page 313 into vertical page-height strips is a more efficient method of operation.

Fillmap Merging

As described above, the contents of a page are converted to a fillmap representation. In another arrangement, the page contents may be partitioned into multiple z-ordered groups of objects and a separate display list and fillmap may be created for each group. The z-ordered groups of objects are known as 'z-bands'. A combination of the z-bands forms a representation of the final page contents. In order to render the page, the z-band fillmaps are first merged into a single new fillmap. The process of combining multiple z-bands into a single fillmap is known as 'fillmap merging'. The process of dividing the page contents in the z direction and merging resultant fillmaps may be repeated many times until the final page representation has been created.

In one arrangement, z-banding is performed by partitioning the page objects into fixed-size groups, for example, z-bands comprising groups of five thousand (5000) objects. The z-bands may be merged once a certain number of z-band fillmaps have been accumulated. Merging of the z-bands in such a manner can provide improved performance and lower memory usage compared to the creation of a single fillmap containing all the page objects.

The process of merging a set of z-band fillmaps will now be described. As described above, each fillmap is divided into tiles. Each tile contains edge data for the objects that overlap the tile. A tile which contains no objects is empty. A new fillmap containing the content of the z-band fillmaps that will be merged is created. The fillmap is then divided into merge regions. A merge region is a set of tiles in the new fillmap, which contain merged tile data from the set of z-band fillmaps. Regions in the new fillmap that have no contribution from the z-band fillmaps are known as 'empty regions'.

Each merge region is treated in turn. For each tile in the merge region, the corresponding tiles are retrieved from the related z-band fillmaps. The edges in the corresponding tiles are combined together to create a new tile that is then inserted into the new fillmap. Edge tiles are combined in increasing z order. As the edges are merged together, new regions are created. Each region requires an updated compositing stack that represents the new region content. The creation of the new compositing stack involves concatenating the compositing stacks from the original regions in the original z ordering. Once all merge regions have been processed, the original z-band fillmaps are discarded. All references to fills and compositing stacks that are no longer required can also be deleted.

Figure 5:
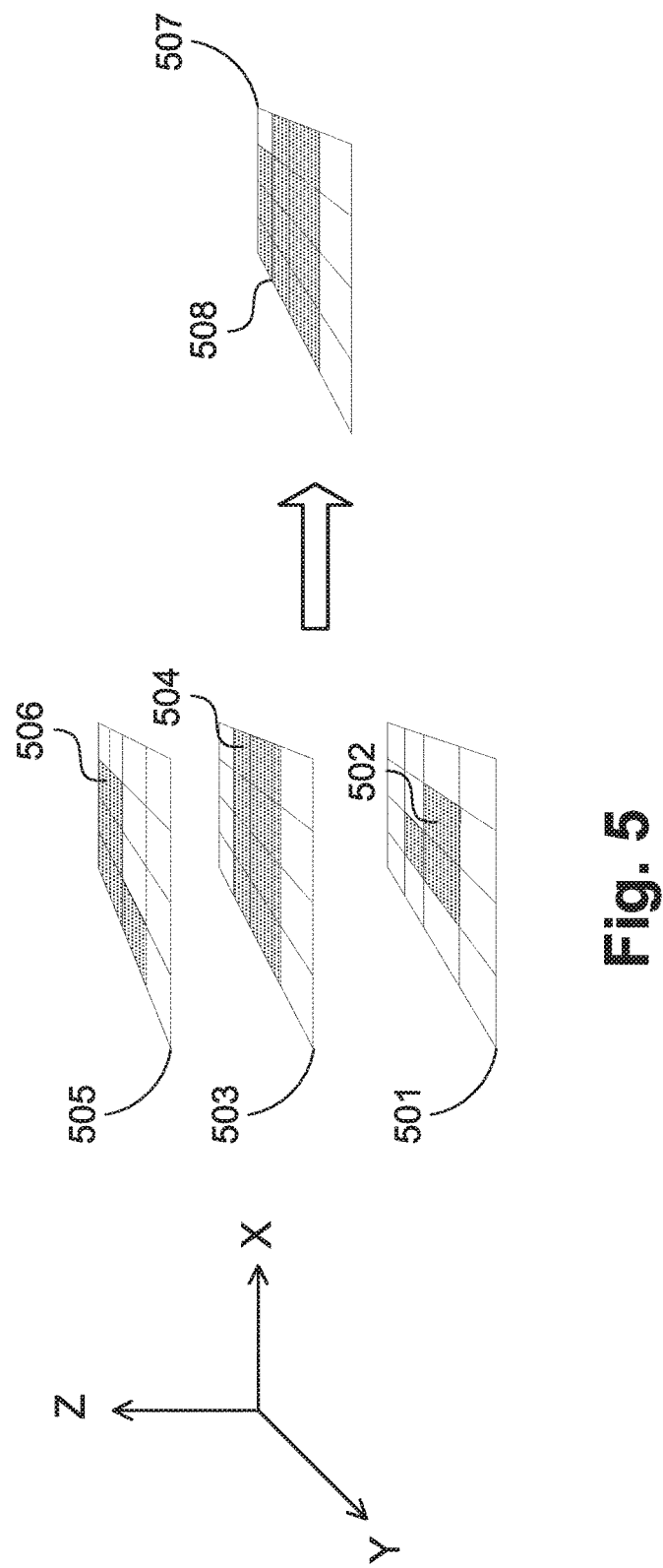
FIG. 5 is a diagram showing the merging of three z-banded fillmaps into a single fillmap.

FIG. 5 shows an example of merging three z-band fillmaps into a single fillmap. In FIG. 5, a fillmap 501 contains, for example, the first five thousand (5000) objects on the page. The objects only cover part of the page. Fillmap tiles 502 that are not empty in the fillmap 501 are shaded in FIG. 5. The next five thousand (5000) objects are contained in a second fillmap 503. The shaded fillmap tiles 504 contain data for the five thousand (5000) objects. The third fillmap 505 contains the remaining one-thousand (1000) objects. The shaded region 506 shows the tiles that contain edge data for the remaining one-thousand (1000) objects.

As seen in FIG. 5, fillmap 507 shows the result after merging the z-band fillmaps 501, 503 and 505. The tiles 508 in the fillmap 507 that contain data are shown shaded. The set of tiles 508 in the resultant fillmap 507 that contains data is the union of the corresponding tiles 502, 504 and 506 that contain data in each of the z-band fillmaps 501, 503 and 505. A method 1100 of merging fillmaps, will be described in detail below with references to FIGS. 11 and 12.

Some print jobs have large amounts of content that is repeated over multiple pages. One example of such a print job is a document that has a common header and footer on each page. Another example of such a print job is a form letter that is mail-merged to create personalised versions for a large number of people.

One method for improving performance in print jobs which have large amounts of repetition is to identify the repeated content, cache the repeated content in a partially processed form, and then re-use the cached content when the content is seen subsequently. By re-using the partially processed content, unnecessary processing may be eliminated and thereby performance improved.

Figure 6:
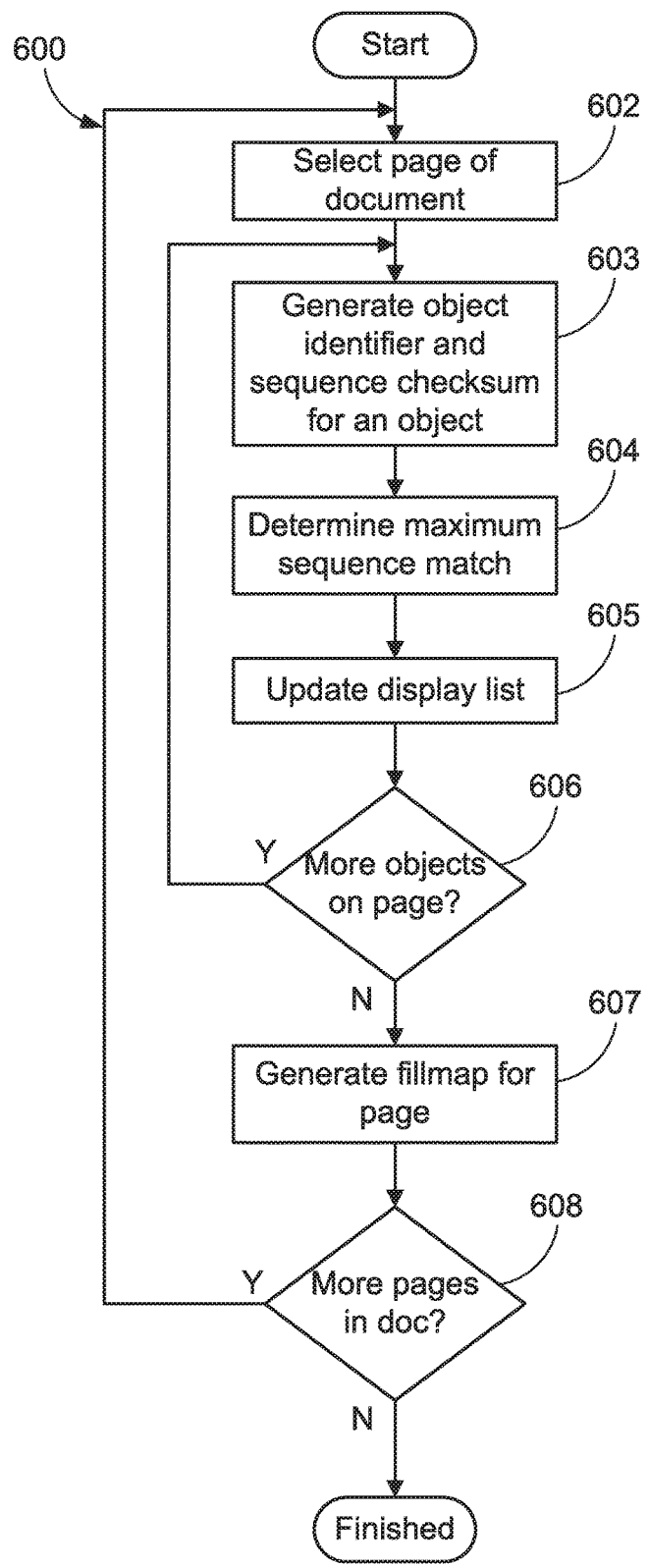
FIG. 6 is a flow diagram showing a method of generating a fillmap.

A method 600 of generating a fillmap for a page will be described below with reference to FIG. 6. The method 600 re-uses content from previous pages. The method 600 may be implemented as one or more software code modules of the software application program 133, resident in the hard disk drive 110 of the printer module 101, and being controlled in its execution by the processor 105.

As described in relation to the example of FIG. 3B, the page information 313 is processed by the PDL interpreter 306 and information about the page 313 is passed to the display list (DL) generator 315 via the drawing interface 314. The display list (DL) generator 315 determines content that has been identified before (i.e., the content has been determined to be repeated on different pages of the document 301). The display list (DL) generator 315 caches the repeated content in an intermediate format where the repeated content can be re-used on subsequent pages. The method 600 determines and re-uses page content.

As described below, the method 600 may be used for determining a repeated sequence of a predetermined number (or "fixed length) of display list objects across display lists, where the repeated sequences are determined to occur, for example, on different pages of the document 301.

The method 600 will be described by way of example with reference to the page 313 of the document 301 shown in FIG. 3B. The method 600 starts processing the document 301 at the beginning of the document 301. A new display list is created for each page (e.g., 313) in the document 301. The display lists may be stored in the memory 106 by the processor 105. As each object (e.g., 311. 312) of the page 313 is received by the display list (DL) generator 315, via the drawing interface 314, a unique 'object identifier' is generated for the object. A second identifier, referred to as an object-sequence identifier, is also generated for each object based on a predetermined number of prior objects. Accordingly, the image data for the page 313 is associated with the unique identifiers.

The method 600 begins at selecting step 602, where a first page 313 of the document 301 is selected, under execution of the processor 105, and a display list is created within the memory 106 for the selected page 313.

The method 600 then proceeds from step 602 to generating step 603, where a unique identifier and an object-sequence identifier is generated for a first object of the selected page. The unique object identifier generated at step 603 is generated from the parameters of the object being drawn. Therefore, the object identifier for an object may be used to detect the object on future pages. The object identifier for prior objects can similarly be used to detect repeated sequences of objects. A method 700 of generating a unique identifier and an object-sequence identifier, as executed at step 603, will be described in detail below with reference to FIG. 7.

The method 600 then proceeds from step 603 to determining step 604, where the object-sequence identifier is used to determine a maximum-length object-sequence that is repeated from a previous page. The maximum-length object-sequence comprises at least a predetermined number of consecutive objects. The maximum-length repeated object-sequence represents a possibly reusable sequence of objects. The maximum-length repeated object-sequence may therefore be cached in the form of a fillmap, referred to as an 'intermediate page format', within the memory 106 for reuse in further display lists. The object-sequence may then be subsequently sourced from the cached fillmap and reused when the object-sequence is repeated on future pages. A method 800 of determining a maximum-length object-sequence, as executed at step 604, will be described in detail below with reference to FIG. 8.

Then at updating step 605, the display list for the page selected at step 602 is updated 605 within memory 106 based on the detection of the repeated object-sequence at step 604. For some objects of the selected page, a repeated object sequence may not be determined at step 604. Where a repeated object sequence is not be determined at step 604, the display list for the page selected at step 602 is updated as described above. Where a repeated object sequence could be determined at step 604, the display list is updated as described in method 900. Method 900 of updating a display list for a page, as executed at step 605, will be described in detail below with reference to FIG. 9.

At decision step 606, if there are more objects on the page 313 to be processed, then the method 600 returns to step 603 to repeat steps 603 to 605 for a further object of the page 313. Otherwise, if there are no more objects for the page 313 to be processed, then the method 600 proceeds to generating step 607.

At generating step 607, one or more z-band fillmaps are generated for the page 313, under execution of the processor 105, and stored in the memory 106. During generation and merging of the z-map fillmaps, repeated page content may be provided by cached fillmaps. Providing the repeated page content by cached fillmaps thereby bypasses the process of creating the display list objects and then processing the display list objects into fillmap data each time.

The method 600 proceeds from step 607 to decision step 608, where if there are more pages in the document 301 to be processed, then the method 600 returns step 602, to select a next page and start creation of a new display list. Otherwise, the generation of the fillmap data for the document 301 is complete and the method 600 concludes.

As described above, at processing step 320, the page 313 is read and processed by the PDL interpreter module (PDLi) 306. The PDL interpreter module (PDLi) 306 converts content of the page 313 into a sequence of drawing instructions which are passed to the Display List (DL) generator 315, via the drawing interface 314.

In accordance with the described methods, the PDL interpreter module (PDLi) 306 generates 'requests' that are passed across the drawing interface 314 to the Display List (DL) generator 315. The requests that are passed across the drawing interface 314 may include the following information:
  (i) Information about a new page, known as 'page context'.
  (ii) Information about a sequential set of objects, known as a 'group context'. The group context describes common attributes for all objects that are in a group. Groups are delimited by start and finish requests, and groups can be nested.
  (iii) Information about objects that should be drawn on the page.

To fully describe the appearance of an object on a page, the described methods consider the object information, information for all enclosing groups and information about the page.

As each request is processed by the DL generator 315, one of several actions is performed based on a 'request type'. As will be described in detail below, the requests may be a 'page start' request, a 'group start' request, a 'group end' request or an 'object draw' request.

Figure 7:
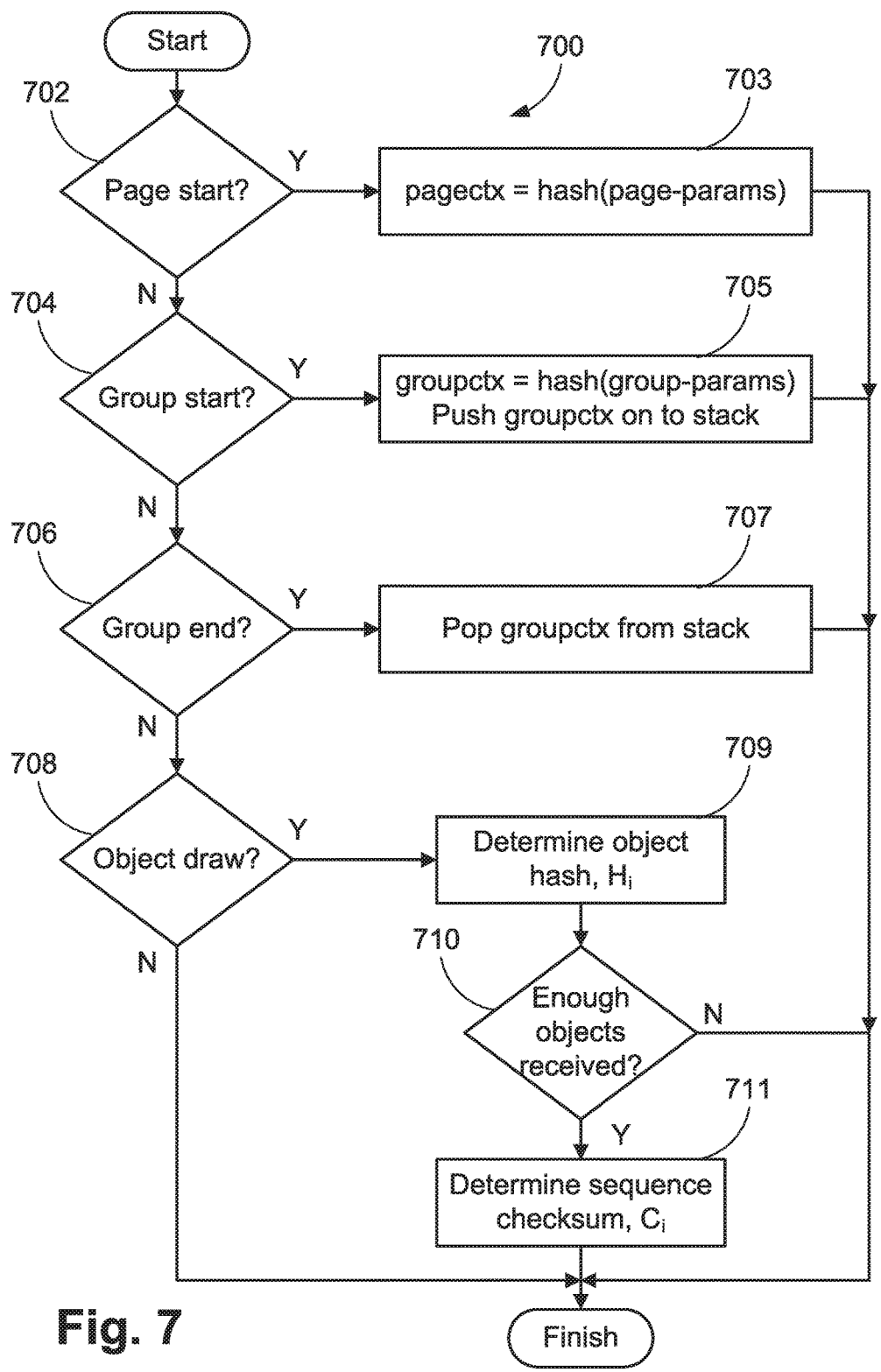
FIG. 7 is a flow diagram showing a method of generating a unique identifier and an object-sequence identifier, as executed in the method of FIG. 6.

The method 700 of generating a unique identifier and an object-sequence identifier, as executed at step 603, will now be described with reference to FIG. 7. The method 700 may be implemented as one or more software code modules of the software application program 133, resident in the hard disk drive 110 of the printer module 101, and being controlled in its execution by the processor 105.

The method 700 begins at decision step 702, where if the Display List (DL) generator 315, under execution of the processor 105, determines that the request being passed to the Display List (DL) generator 315 is a page start request 702, then the method 700 proceeds to hashing step 703. Otherwise, if the request passed to the Display List (DL) is not a page start request, then the method 700 proceeds to decision step 704.

At step 703, information about the page included with the page start request is hashed 703 using a strong hash function. The strong hash function generates a hash value that is considered sufficiently unique that the chance of a collision (i.e., where two different items result in the same hash value) is insignificant. Any suitable hash function may be used at step 703. However, one example of a suitable hash function is the MD5 message digest algorithm, which generates a one-hundred and twenty eight (128) bit hash value. The page hash value is retained for the duration of the page as a unique identifier of the page.

Although any strong hash functions may be used at step 703, given that cryptographic hash functions are considered to be collision resistant and are studied to quantitatively measure a likelihood of a collision, in some arrangements cryptographic hash functions, such as for example the secure hash algorithms (SHA) known as SHA-1, SHA-2 or SHA-3 may be used at step 703. The method 700 concludes following step 703.

If the Display List (DL) generator 315, under execution of the processor 105, determines that the request is not a page start request, then at step 704, the DL generator 315 checks for a group start request. If the request is a group start request, then the method 700 proceeds to hashing step 705. Otherwise, if the request passed to the Display List (DL) generator 315 is not a group start request, then the method 700 proceeds to decision step 706.

At step 705, the information about the group included with the group start request is hashed 705 using the same strong hash function used at step 703. The method 700 concludes following step 705.

A group can contain zero or more objects, and can include other groups. An object can therefore be a member of multiple groups, all of which can influence the appearance of the object on the page. To keep track of all active groups, the hash value associated with each group start request is pushed on to a stack configured within memory 106, under execution of the processor 105. When a group end request is subsequently received, the corresponding group start hash value is removed from the stack. Because groups are strictly nesting, the corresponding group start hash value will be the entry at the top of the stack. The stack of group start hash values is retained for the duration of the page.

If the Display List (DL) generator 315, under execution of the processor 105, determines that the request being passed to the Display List (DL) generator 315 is not a page start or group start request, then at step 706 the DL generator 315 checks for a group end request. If the Display List (DL) generator 315, under execution of the processor 105, determines that the request is a group end request, then the method 700 proceeds to popping step 707. Otherwise, if the request passed to the Display List (DL) is not a page start or group start request, then the method 700 proceeds to decision step 708.

At step 707, the hash value for the most-recent group is popped off the stack under execution of the processor 105. The method 700 concludes following step 707.

At step 708, the display list (DL) generator 315 checks for an object draw request 708. If the Display List (DL) generator 315, under execution of the processor 105, determines that the request being passed to the Display List (DL) generator 315 is an object draw request at step 708, then the method 700 proceeds to determining step 709. Otherwise, if the request passed to the Display List (DL) generator 315 is not an object draw request, then the method 700 concludes.

At step 709, a hash is determined from information about the object associated with the object draw request determined at step 708 along with the page hash value and the stack of group hash values determined at steps 703 and 705, respectively. The hash for the object is determined at 709 using the same strong hash function used at steps 703 and 705. Using the same strong hash function ensures that the object hash value determined at step 709 for the object includes both the information as well as the current drawing context information.

Some object and context information, such as the pixel data associated with an image object, can be quite large. Where the object and context information is quite large, it may be more efficient to replace the large data entity with a unique identifier that represents the data. The PDL interpreter (PDLi) 306 may be configured for augmenting the large data entity with a unique identifier that represents the data. For example, the PDL interpreter (PDLi) 306 may be configured to determine when images are repeated in a document and associate each image with a unique image identifier. The unique image identifier may be used in determining the hash at step 709 instead of including all of the pixel data for the image in the hash calculation.

Each object is also assigned a sequential identifier (ID) as the unique identifier for the object. The sequential identifier (ID) starts at one (1) for the first object in the document 301, and is incremented by one (1) for each subsequent object until the end of the document. At step 709, the object associated with the object draw request determined at step 708 is assigned a sequential identifier (ID) as the unique identifier for the associated object.

The object hash value, together with the unique identifier (ID) associated with the object draw request determined at step 708, are stored in an ObjHash[ ] array configured within memory 106. The indices of the ObjHash[ ] array are the unique object identifiers (IDs) as determined at step 709. The values of the ObjHash[ ] array entries are the corresponding object hash values. Since the hash function is a strong hash function, if a new object whose hash value matches the hash value of a previously-seen object is received in accordance with the described methods, then the new object can be treated as a repetition of the previously-seen object. The result of the process described above in relation to step 709 an array of object hash values is determined, with one entry in the array for each object that is received by the display list (DL) generator 315. The hash values are stored within the memory 106 in the order that the objects are received. For example, ObjHash[17] contains the hash value of the $17^{th}$ object that was received for the display list (DL) generator 315.

A sliding-window scan is used in the method 700 to determine object-sequences that are repeated within the document 301. The sliding-window scan has a window size, W. The window size, W, is the shortest length of repeated object-sequences that will be detected. For example, if the value of the window size, W, is ten (10), then object-sequences that are ten (10) objects or longer are considered to be candidates for repetition detection. After the object hash determining step 709, the method 700 proceeds to decision step 710, where a determination is made, under execution of the processor 105, as to whether enough objects have been received to fill the window. If enough objects have been received at step 710, then the method 700 proceeds to determining step 711. Otherwise, the method 700 concludes.

At step 711, a checksum that identifies the sequence of the last W (e.g., the last ten (10) objects if the window size is ten (10)) objects before the object associated with the object draw request (i.e., as determined at step 708) is determined as the object-sequence identifier for the object. A rolling checksum algorithm is used to create a checksum for all possible sequences of W consecutive objects. The checksum is determined by applying a checksum calculation to the hash value of the object associated with the object draw request determined at step 708 and the hash values of the previous (W−1) objects. So, for the $n^{th}$ object, the value of the checksum is determined in accordance with Equation (1), as follows:

$$\text{checksum} = f_{checksum}(\text{ObjHash}[n-W+1], \text{ObjHash}[n-W+2], \ldots, \text{ObjHash}[n]) \quad (1)$$

A rolling checksum algorithm has the advantage over a conventional checksum algorithm or hash function in that the rolling checksum algorithm is efficient to incrementally add and remove values from the calculation. For example, to determine the value of the checksum for object (n+1), the following calculation is performed:

$$\text{checksum for } (n+1) = f_{update}(\text{ObjHash}[n-W+1], \text{checksum for } (n), \text{ObjHash}[n+1])$$

The rolling checksum cannot be determined for the first (W−1) objects in each page, as the first (W−1) objects in each page do not comprise enough objects to fill the window. The rolling checksum determination does not need to be so strong to eliminate a likelihood of a collision between different values. Whenever two rolling checksum values are determined to be the same, a simple comparison between the object hash values that make up the two sequences may be performed to confirm that the two sequences of the object hash values are in fact the same.

The result of step 711 described above is that a key-value map of object-sequence checksum values, SeqMap[ ], is accumulated within the memory 106. Keys of the SeqMap[ ] are the object-sequence checksums. The values of the SeqMap[ ] map are a corresponding sub-list of object-sequences with the same checksum value. Each entry in the sub-list comprises two entities:

(i) The unique identifier (ID) of the object that starts the matching object-sequence, as determined at step 709; and (ii) The length of the sequence of objects, where the length is initially set to W.

The entries in the sub-list are ordered by the object-sequence number that starts the sequence.

Figure 8:
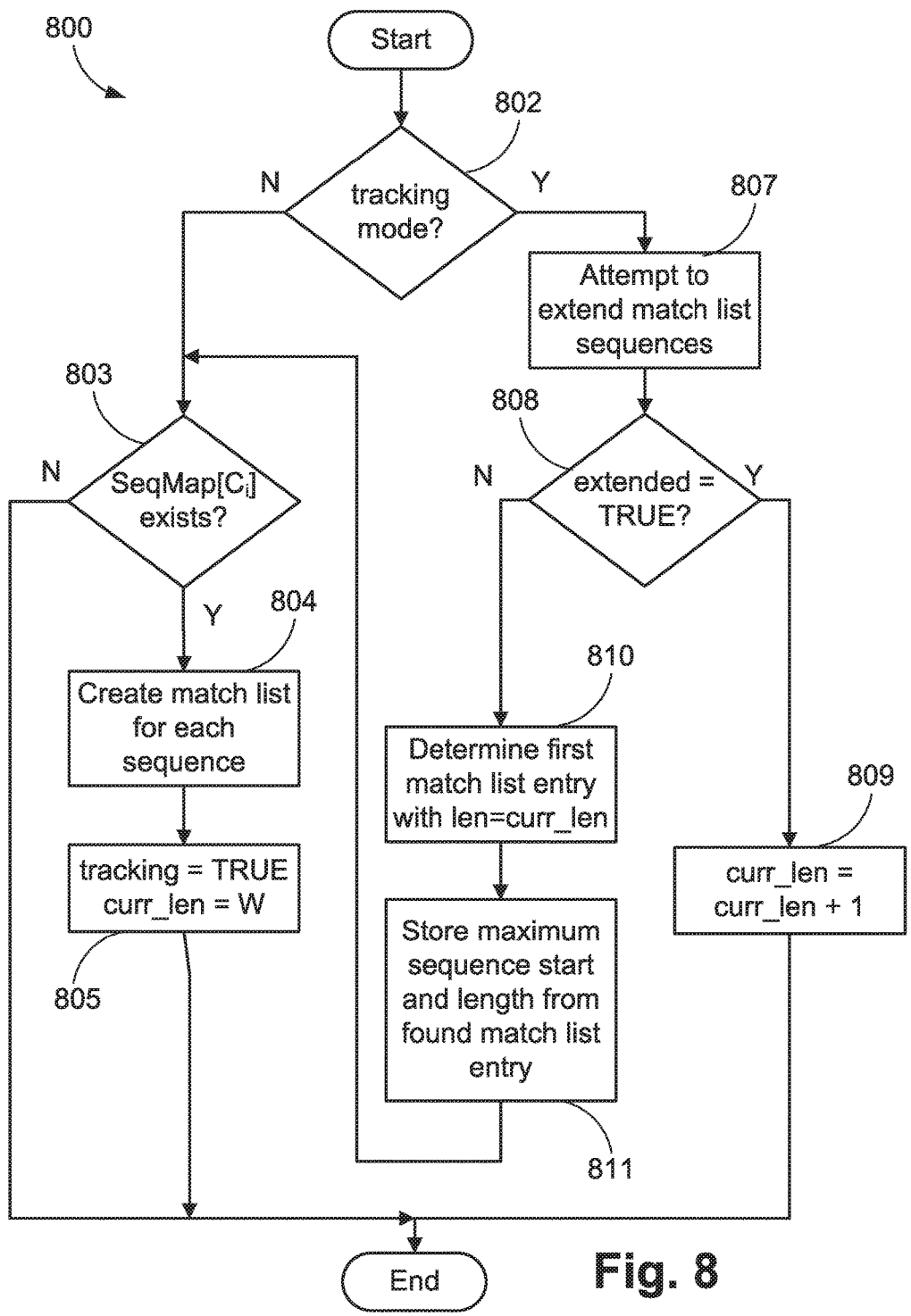
FIG. 8 is a flow diagram showing a method of determining a maximum-length object-sequence.

The method 800 of determining a maximum-length object-sequence, as executed at step 604, will now be described in detail below with reference to FIG. 8. The method 800 may be implemented as one or more software code modules of the software application program 133, resident in the hard disk drive 110 of the printer module 101, and being controlled in its execution by the processor 105. The method 800 may be used for determining reusable objects, for a repeated sequence of objects. As described below, the maximum-length object-sequence may be determined by extending a repeated sequence to further consecutive objects.

At the start of executing the method 800 for determining the maximum object-sequence, an object has been received ("the current object"). Also at the start of executing the method 800, the hash value and sequence checksum (if sufficient objects have been received) have been determined for the object, as at step 603 described above. The current object may be the object associated with the object draw request determined at step 708.

The method 800 begins at determining step 802, where it determined if the system 100 is in "tracking mode". Tracking mode may be indicated by a "tracking mode" variable configured within the memory 101. The tracking mode variable is initialised to FALSE at the beginning of each page, and may be updated to TRUE as described below. If the system 100 is not in tracking mode, then the method 800 proceeds to decision step 803. Otherwise, if the system 100 is in tracking mode, then the method 800 proceeds to extending step 807.

At step 803, if the current object is the end of an object-sequence (of length W) that has been seen previously (i.e., SeqMap[$C_i$] exists), then the method 800 proceeds to creating step 804. Such a sequence has been seen previously if there is an entry in SeqMap[ ] for the current object-sequence checksum value (i.e., $C_i$).

If the sequence has not been identified before, then the method 800 concludes.

If it determined that the object-sequence has been identified before, a MatchList structure is created within the memory 106 at creating step 804. The MatchList is a copy of the sub-list of object-sequences that that were found in SeqMap[ ]. Each entry in the MatchList has two values as follows:

"id"—the object ID of for the start of a previously-seen object-sequence that matches the current object-sequence (ii) "len"—the length of the matching sequence, initialised to the window size, W Next, at initialising step 805, the tracking mode variable is set to TRUE and a current sequence length variable, curr_len, is initialised to the same value as the window size, W. The method 800 concludes following step 805.

For subsequent objects, the method 800 is repeated. In this instance, at the tracking mode determining step 802, it may be determined that the system 100 is in tracking mode (i.e., the tracking mode variable, tracking, is set TRUE) and the method 800 proceeds to extending step 807.

At step 807, an attempt to extend the current object-sequence match is made, under execution of the processor 105, using the current object. The process executed at step 807 is shown in the following pseudo-code:

```
extended = FALSE
for match in MatchList
do
    # can the match be extended by 1 more object?
    if (match.len = curr_len and ObjHash[match.id + n + 1] =
    ObjHash[i])
        match.len += 1
        extended = TRUE
done
```

At step 807, each entry in the match list configured within the memory 106 is checked to determine if the entry represents a candidate for extending the object-sequence match by one more object. The first part of step 807 and the pseudo-code above checks to determine whether a sequence that matches the value of the number of objects represented by the value of the curr_len variable. The second part of step 807 and the pseudo-code above compares the object following the matching previous sequence with the current object (i.e., the most-recently received object). If the object following the matching previous sequence and the current object are the same (e.g., based on a comparison the hash values of the objects), then the matching previous sequence can be extended by one more object.

Next, the method 800 proceeds from step 807 to decision step 808, where if at least one object-sequence in the MatchList was extended (i.e., extended=TRUE) using the current object, then the method 800 proceeds to incrementing step 809.

At step 809, the length of the matching sequence (curr_len) is incremented by one (1) (i.e., curr_len=curr_len+1). The method 800 concludes for the current object following step 809. If it is determined at decision step 808 that no sequence could be extended (i.e., extended=FALSE), then the maximum sequence length (which ended at the previous object) has already been determined and the method 800 proceeds to determining step 810.

At step 810, the first entry in the MatchList having an associated length that matches the length of the matching sequence (i.e., curr_len) is determined under execution of the processor 105. The entry determined at step 810 is the earliest of all the matching maximum length object-sequences.

The method 800 proceeds from step 810 to setting step 811, where the start and length of the earliest matching sequence determined from the MatchList at step 810 is stored within memory 106 for subsequent processing as described below. Following step 811, the method 800 proceeds to step 803.

The steps of the method 800 are repeated for each following object in the document 301. As long as the tracking mode flag remains TRUE, each subsequent object is considered as a candidate to extend one or matching sequences. Eventually an object will be received which cannot be used to extend any of the matching sequences, in which case the maximum-length object-sequence has been detected, and the tracking flag is set to FALSE.

Figure 9:
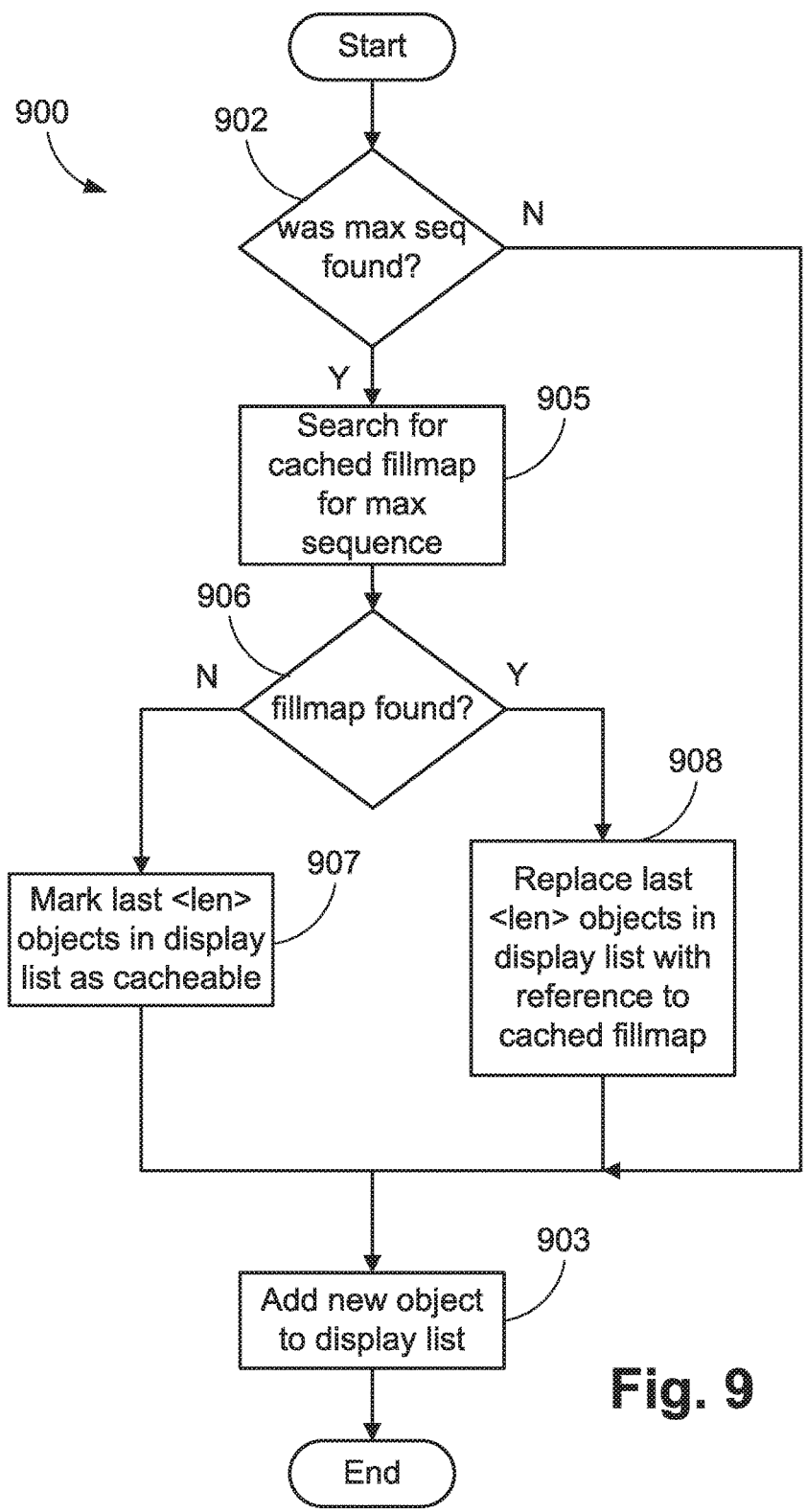
FIG. 9 is a flow diagram showing a method of updating a display list.

A method 900 of updating a display list for a page, as executed at step 605, will now be described with reference to FIG. 9. The method 900 may be implemented as one or more software code modules of the software application program 133, resident in the hard disk drive 110 of the printer module 101, and being controlled in its execution by the processor 105. As described below, each occurrence of a reusable sequence of objects may be associated with a z-order position in a corresponding display list.

The method 900 begins at decision step 902, if no maximum object-sequence was determined at step 604, then the method 900 proceeds to adding step 903.

At step 903, the current object is added to the display list configured within the memory 106 and the method 900 concludes.

If it was determined at step 902 that a maximum object-sequence was determined at 604, then the determined maximum object-sequence is an object-sequence that ended with the previous object and the method 900 proceeds to step 905.

At step 905, the method 900 searches the memory 106 for a cached z-band fillmap corresponding to the maximum object-sequence determined at step 604. Then at decision step 906, if there was no associated cached fillmap found at step 905, then the method 900 proceeds to marking step 907. Otherwise, if there was an associated cached fillmap found at step 905, then the method 900 proceeds from step 906 to replacing step 908.

At step 907, the set of objects at the end of the display list corresponding to the maximum object-sequence is marked as "to be cached" under execution of the processor 105.

When a display list for a page is processed during fillmap generation, the fillmap generator module 307 is configured for subdividing the display list into one or more z-band fillmaps. A plurality of z-band fillmaps may be created to improve performance or reduce memory usage. Before rendering, the set of z-band fillmaps are reduced to a single final fillmap during the fillmap merging process. The plurality of z-bands may include a reusable z-band for an identified reusable sequence of objects. The fillmap generator module 307 configured for generating a separate reusable z-band fillmap (or reusable intermediate graphical representation) for each reusable set of objects that were marked as "to be cached". The separate fillmap is marked with a special "cacheable" flag. The cacheable flag indicates that the fillmap should be retained after fillmap merging (instead of the fillmap being discarded as is normally the case) and retained in a cache configured within the memory 106 after the page has been rendered by the fillmap renderer module 308.

At step 903, the current object is added to the display list configured within the memory 106 and the method 900 concludes.

Alternatively, if there is an associated cached fillmap for the maximum object-sequence found at step 906, then the method 900 proceeds to step 908. At step 908, the set of objects at the end of the display list corresponding to the maximum object-sequence is replaced with a special placeholder. When the display list for the page 313 is converted to z-band fillmaps during fillmap generation by the fillmap generator module 307, the placeholder indicates that the corresponding previously-cached fillmap should be inserted into the stack of z-band fillmaps that make up the intermediate page representation for the page 313. The corresponding previously-cached fillmap is inserted at the z-order position of the placeholder. The method 900 proceeds from step 908 to step 903 as described above.

During fillmap generation by the fillmap generator 307, the z-band fillmaps are merged into a single final fillmap that represents the contents for the page 313, for example. In the methods described above, merging of z-band fillmaps occurs. However, any fillmap that is marked as cacheable is not disposed of after the merging of the fillmaps is complete, but the fillmap marked as cacheable is instead cached within the memory 106 for potential re-use over subsequent pages. As described below, a cached reusable fillmap may be merged with another fillmap in accordance with an order of z-bands associated with the merged fillmaps.

Figure 10:
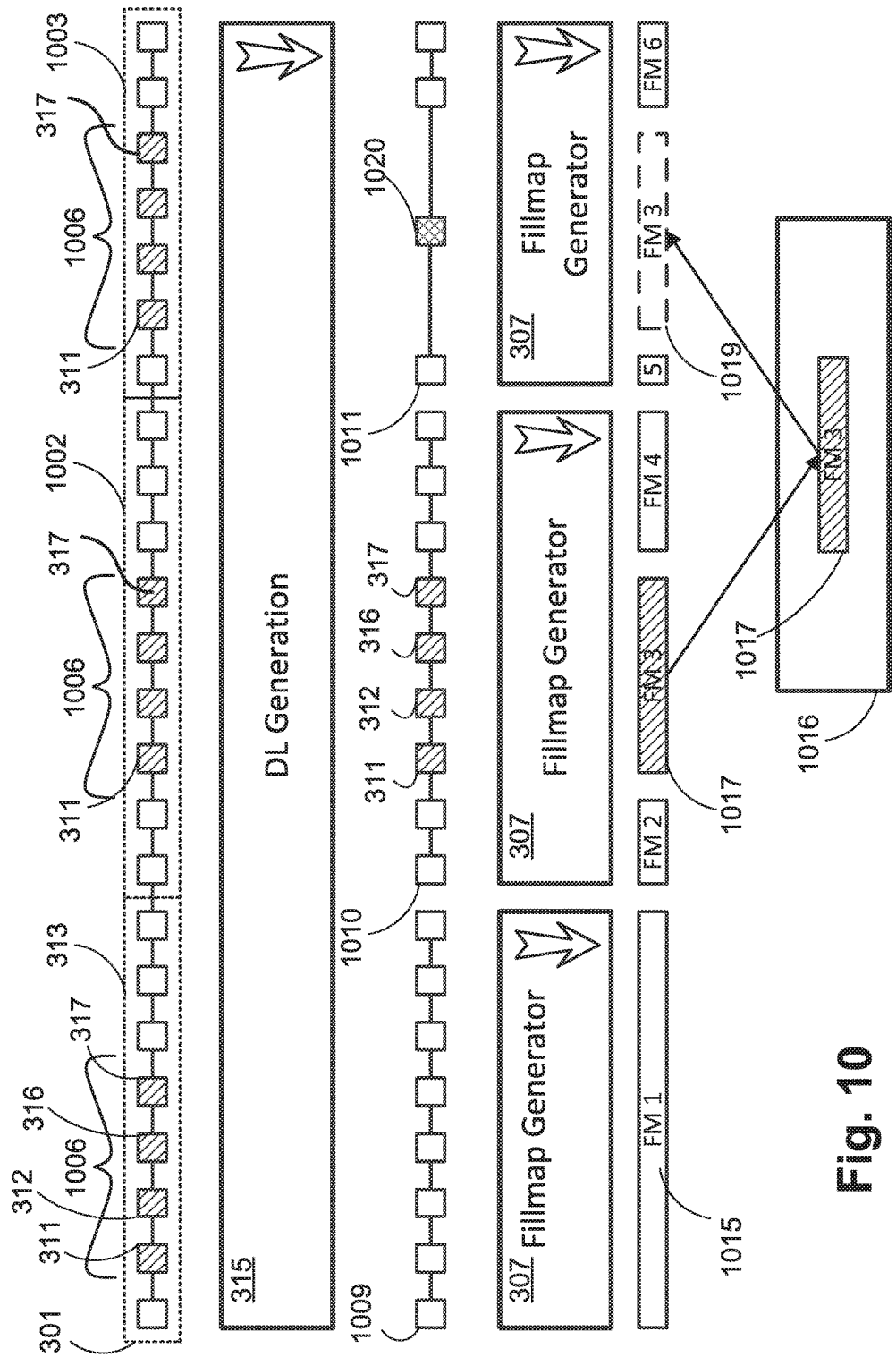
FIG. 10 is a diagram showing the processing of an example document containing an object-sequence that is repeated on two (2) pages of the document.

The method 600 will be described in further detail by way of example with reference to FIG. 10. FIG. 10 shows the example document 301 in more detail. As seen in FIG. 10, the document 313 comprises a stream of objects divided into three pages 313, 1002 and 1003. The object stream is processed by the display list (DL) generator 315 into a set of display lists 1009, 1010, and 1011.

Each of the display lists 1009, 1010, and 1011 corresponds to one of the pages in the document 301. Each of display lists 1009, 1010, and 1011 are processed by the fillmap generator 307 into a set of z-ordered fillmaps. Page 313 results in a single fillmap (FM1) 1015 after processing by the fillmap generator 307, whereas the second page 1002 and third page 1003 result in three separate fillmaps each. As seen in FIG. 10, page 1002 results in three fillmaps (i.e., referenced as FM 2, FM 3 and FM 4 in FIG. 10) after processing by the fillmap generator 307. Similarly, page 1003 results in three fillmaps (i.e., referenced as FM 5, FM 3 and FM 6 in FIG. 10) after processing by the fillmap generator 307.

Each group of three fillmaps may be merged into a single final fillmap for the corresponding page. All the final fillmaps may be rendered into pixel output. As seen in FIG. 10, the second page 1002 contains a 4-object sequence 1006 that is a repetition of a corresponding 4-object sequence 1006 that is present on the first page 313.

Note that in the example of FIG. 10, the fixed-size window (W) for determining repeating object sequences, as at step 604, was three objects. That is, the SeqMap[ ] map contained object-sequence checksums for each set of three consecutive objects. As a result, the original determination of repeated content on the second page 1002 was that the 3-object sequence starting at object 311 matched the 3-object sequence 1005. By following the method 800 executed at step 604, as described with reference to FIG. 8, the matching sequence 1006 was extended to four (4) objects. The extension of the matching sequence 1006 was performed by determining that the object 317 of page 313 was matched by the next object 317 that was received by the display list (DL) generator 315 for the page 1002.

In the example of FIG. 10, as page 1002 is only the first time that the sequence 1006 has been repeated, there will be no corresponding cached fillmap. Instead, the display list (DL) generator 315 adds the objects 311, 312, 316 and 317 to display list 1010 and marks the objects 311, 312, 316 and 317 as "to be cached". When the display list 1010 is processed into fillmaps by the fillmap generator 307, a separate z-ordered fillmap (FM 3) 1017 is created for the repeated 4-object sequence 1006. Fillmap 1017 is added to a fillmap cache 1016. When the second page 1002 is rendered, the cached fillmap 1017 is retained in the cache 1016 for possible re-use. The third page 1003 also contains the same repeated 4-object sequence 1006. As page 1003 is the third time that the sequence 1006 has been seen, a cached version of the resultant fillmap 1017 is available in the cache 1016. As a result, the display list (DL) generator 315 does not add the four (4) objects 311, 312, 316 and 317 to the display list 1011. Instead, display list (DL) generator 315 adds a special placeholder entry 1020, which contains a reference to the cached fillmap 1017. When the fillmap generator 307 processes the display list 1011, the fillmap generator 307 converts the placeholder entry 1020 into a reference 1019 to the cached fillmap 1017 in the fillmap cache 1016. The three fillmaps created by fillmap generator 307 will then be merged and rendered into pixel output.

For every object-sequence that is determined, as at step 604, there is a corresponding cached fillmap that represents the object-sequence in an intermediate format. A previously-determined repeating object-sequence may be directly followed by a further sequence of consecutive display list objects such that the longer sequence may in turn be a candidate for repetition on subsequent pages. In such a case, the further sequence of consecutive display objects may be converted into a separate fillmap that is then merged with the cached fillmap (e.g., 1017) for the existing object-sequence. The result of such fillmap merging is a new cached fillmap that represents the concatenation of the original object-sequence and the further sequence of display list objects in an intermediate format.

The methods described above improve performance by caching repeated content. However, the described methods may introduce some overhead in execution time. If a document does not contain much repeated content then it may be more efficient not to enable the determination of repeated sequences and repeated content caching for the document as described above.

While it is usually not possible to determine in advance whether content is repeated in pages of a document, some steps may be executed to determine whether to enable the functionality of the methods described above. The steps used to determine whether to enable the functionality of the methods may involve enabling the repeated object-sequence caching on the basis of mechanisms or heuristics. For example, in one arrangement, an operator of the printing system 100 may determine in advance whether to enable repeated content caching, as described above, for one or more documents. The advance determination may be performed, for example, if the operator had some knowledge about the types of documents to be printed. In another arrangement, the repeated content caching function described above may be enabled only when a document contains more than a pre-determined number of pages. Enabling repeated content caching only when a document contains more than a pre-determined number of pages may save the overhead of checking for repeated content in short jobs which are unlikely to benefit from the described methods.

In still another arrangement, the PDL interpreter module (PDLi) 306 may be configured to disable the repeated content caching facility if a document being processed does not contain any "complex content" (using some heuristic evaluation). Disabling the repeated content caching facility if a document being processed does not contain any "complex content", may be advantageous when the overhead of detecting the repeated content is greater than any saving gained by eliminating repeated simple content.

In still another arrangement, a pre-determined amount of memory 106 may be allowed for the fillmap cache so that the fillmap cache has a predetermined size less than the maximum available memory. In order to operate with a limited-size cache, the system 100 takes some action when the cache becomes full. For example, the system 100 may be configured to turn off the repeated object-sequence determination methods described above when there is no more room in the cache to add more cached fillmaps.

In another arrangement, the least-recently used fillmap may be evicted from the cache when there is no more room in the cache to add more cached fillmaps. In still another arrangement, fillmaps may be evicted from the cache once the fillmaps have failed to be re-used for a pre-determined number of pages.

In still another arrangement, the page number may be tracked where cached fillmaps have been re-used and the cached fillmaps may be evicted from the cache once the cached fillmaps fail to be re-used at a next predicted page.

Figure 11:
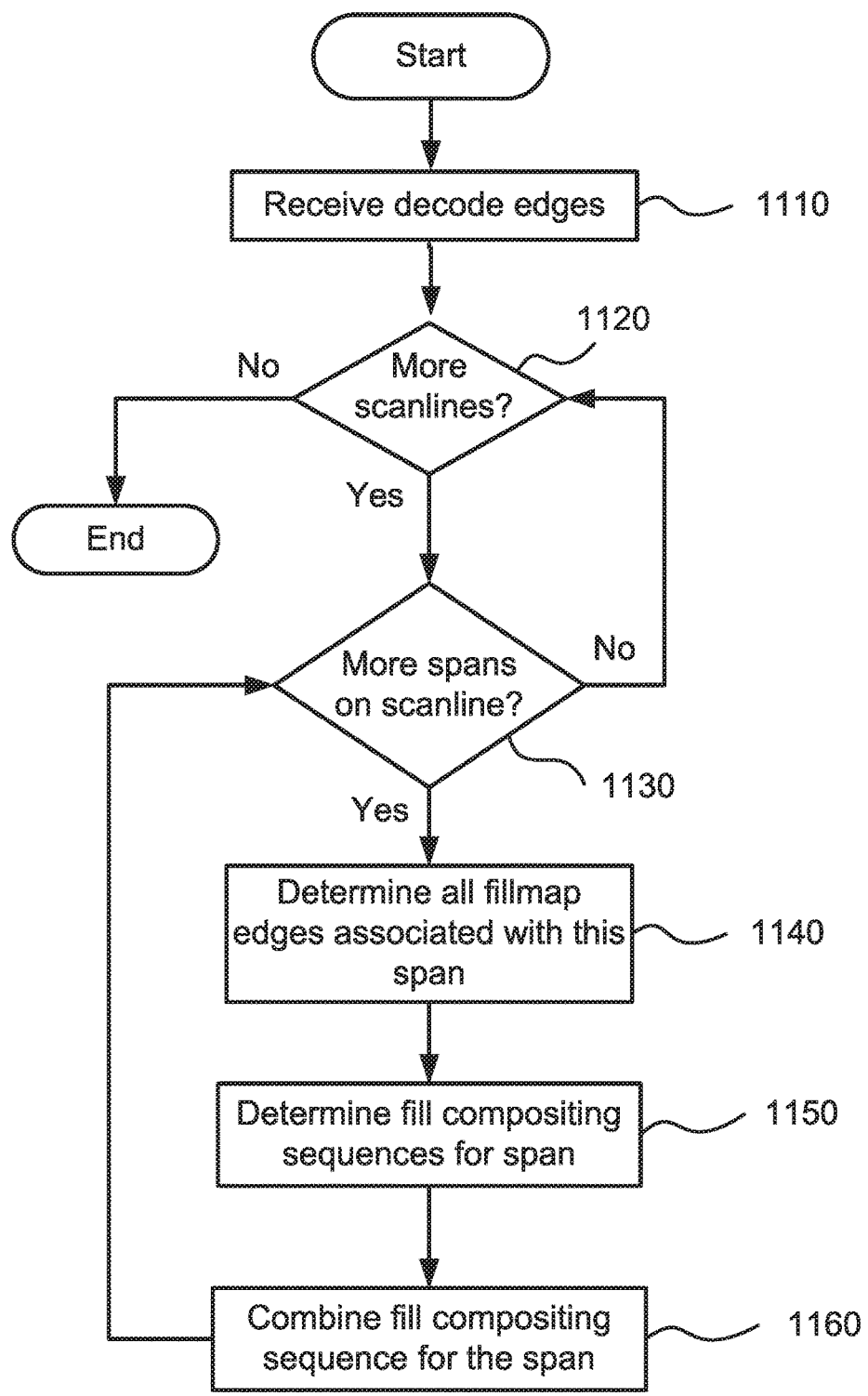
FIG. 11 is a detailed schematic flow diagram showing a method of merging fillmaps.

The method 1100 of merging z-band fillmaps into a single fillmap will be described in detail below with references to FIGS. 11 and 12. The method 1100 may be implemented as one or more software code modules of the software application program 133, resident in the hard disk drive 110 of the printer module 101, and being controlled in its execution by the processor 105.

The method 1100 begins at receiving step 1110, where decoded edges from fillmap tiles that contribute to a merged fillmap tile are received under execution of the processor 105.

Decision step 1120 is then executed to iterate through each scanline of the merged tile by checking whether there are more scanlines to be processed. If there are no more scanlines to be processed, the process of merging concludes. However, when more scanlines need to be processed, then the fillmap merging method 1100 proceeds to decision step 1130 to iterate through each span on the next scanline A span refers to the series of pixels between two neighbouring edges crossing at different x-positions along the same scanline Edges from contributing z-band fillmap tiles are combined to identify spans to be processed at step 1130. Hence, in the merged fillmap tile, a span can be the result of two edges coming from the same z-band fillmap or coming from different z-band fillmaps.

If there are no more spans to be processed, then the method 1100 returns to step 1120. Where there are more spans to be processed, the method 1100 proceeds to determining step 1140, where all z-band fillmap edges associated with the current span are determined under execution of the processor 105. In one arrangement, all z-band fillmap edges associated with the current span are determined at step 1140 by reading edges from a single queue of sorted z-band fillmap edges, known as "merge-queue", configured within the memory 106. The merge-queue is created within the memory 106 prior to processing the current scanline and stores a list of edges from all the contributing z-band fillmaps that intersect with the current scanline. The edges in the merge-queue are sorted in ascending x order. A z-band fillmap edge is associated with a span if the z-band fillmap edge crosses the current scanline at the same x-position as the starting x-position or the ending x-position of the current span.

In an alternate arrangement, the z-band fillmap edges associated with a span may be determined by reading edges in ascending x order from a multiple of queues, each queue being associated with a contributing z-band fillmap. Each merge-queue configured within the memory 106 stores a list of edges that belong to the associated z-band fillmap and intersect with the current scanline. The edges in each merge-queue are sorted in ascending x order.

After all z-band fillmap edges associated with the current span have been determined at step 1140, the method 1100 proceeds to determining step 1150 is executed by the processor 105 to determine all fill compositing sequences for the current span. Step 1150 is carried out by determining the fill compositing sequence referenced by each associated contributing z-band fillmap edge.

The method 1100 then proceeds from step 1150 to combining step 1160, where the fill compositing sequence of the current span is determined by combining, "stacking" or concatenating the z-band fillmap compositing sequences associated with the current span according to the Z-order of the z-band fillmap compositing sequences. Once the z-band fillmap compositing sequences for the current span are combined, the method 1100 returns to step 1130.

An example of merging two z-band fillmap tiles will now be described with respect to FIG. 12. The example of FIG. 12 shows the first three scanlines of two accumulated fillmap tiles 1210 and 1220 to be merged into a merged fillmap tile 1230. As seen in FIG. 12, each scanline is divided into a respective set of one or more contiguous source spans. Each source span is associated with an edge. If an edge is on the same scanline as a span, the span commences with the edge (i.e., the "commencing edge").

An edge may extend across multiple scanlines Such an edge is referred to as a "multiline edge". For example, the background (or "lower Z-level") accumulated z-band fillmap 1210 contains two edges 1211 and 1212 in the first three scanlines (i.e., Scanline 0, Scanline 1 and Scanline 2) of the fillmap 1210. The foreground (or "higher Z-level") accumulated fillmap 1220 contains three edges 1221, 1222 and 1223 in the first three scanlines (i.e., Scanline 0, Scanline 1 and Scanline 2) of the fillmap 1220. Edges 1221 and 1222 are associated with fill compositing sequences that need to be composited with a background representation for rendering. In the example of FIG. 12, the fill compositing sequence associated with edge 1223 is fully opaque and does not need a background for compositing and rendering.

As described above, the spans of the accumulated z-band fillmaps are merged by combining the fill compositing sequences of the respective one or more source spans correspondingly positioned in the respective source scanlines. The resultant span is also referred to as the merged span.

Starting at 'Scanline 0', first merged span 1231 is started by edge 1211 and edge 1221, and ended by edge 1212. The fill compositing sequence of the first merged span 1231 is the combination of fill compositing sequences of the edges 1221 and 1211 respectively. Similarly, the second merged span 1232 is started by edge 1212 and ended by edge 1222. The second merged span has the combined fill sequence of edge 1212 and edge 1221. The third merged span 1233 is started by edge 1222 and extends to the end of Scanline 0. The third merged span 1233 has the combined fill sequence of edge 1212 and edge 1222.

On Scanline 1, the first merged span is started by edge 1211 and edge 1221, and ended by edge 1223. The first merged span has the combined fill sequence of edge 1221 and edge 1211. The second merged span is started by edge 1223 and ended by edge 1212. Since fill compositing sequence associated with edge 1223 is opaque, the fill compositing sequence associated with edge 1223 does not need a background fill for compositing. Thus, the second merged span comprises only the fill sequence of edge 1223. The third merged span is started by edge 1212 and ended by edge 1222. Similar to the second merged span, the third merged span comprises only the fill sequence of edge 1223. The fourth merged span is started by edge 1222 and extended to the end of Scanline 1. The fourth merged span comprises the combined fill sequence of edge 1212 and edge 1222.

On Scanline 2, the first merged span is started by edge 1211 and edge 1221, and ended by edge 1222. The first merged span comprises the combined fill sequence of edge 1221 and edge 1211. The second merged span is started by edge 1222 and ended by edge 1212. The second merged span comprises the combined fill sequence of edge 1211 and edge 1222. The third merged span is started by edge 1212 and extended to the end of scanline 2. The third merged span comprises the combined fill sequence of edge 1212 and edge 1222. The merged fillmap tile 1230 is stored in a pre-allocated buffer configured within the memory 106.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for rendering a page description language (PDL) document, the method comprising:
   receiving a plurality of display lists, each display list comprising a plurality of display list objects;
   determining a repeated sequence of a predetermined number of consecutive display list objects across the display lists;
   determining a reusable sequence of display list objects, for the repeated sequence, by extending the repeated sequence to further consecutive display list objects, each occurrence of the reusable sequence being associated with a z-order position in a corresponding display list;
   subdividing at least one display list, at the z-order position of the reusable sequence in said display list, into a plurality of z-bands including a reusable z-band for the determined reusable sequence;
   generating a reusable intermediate graphical representation for the determined reusable sequence and a further intermediate graphical representation for at least one other z-band;
   merging said further intermediate graphical representation with the reusable intermediate graphical representation in accordance with an order of said z-bands; and
   rendering the page description language (PDL) document using the merged representations.

2. The method according to claim 1, further comprising:
   subdividing a second display list into a second plurality of z-bands using a reference to the reusable intermediate graphical representation at a z-order position of the reusable sequence in the second display list; and
   merging, in accordance with an order of said z-bands, an intermediate graphical representation for the second plurality of z-bands and the reusable intermediate graphical representation.

3. The method according to claim 1, further comprising:
   determining a second reusable sequence of display list objects by extending the repeated sequence of display list objects to a further plurality of consecutive display list objects of a further display list, the second reusable sequence being longer than the previously detected reusable sequence;
   generating a second reusable intermediate graphical representation for the identified second reusable sequence by merging an intermediate representation for the further plurality of consecutive display list objects with the previously generated reusable intermediate graphical representation.

4. The method according to claim 1, wherein occurrences of the repeated sequences are determined on different pages of the document.

5. The method according to claim 1, wherein image data for display list objects is associated with unique identifiers.

6. The method according to claim 1, further comprising:
identifying an occurrence of the reusable sequence in a second display list using metadata associated with the reusable sequence; and
subdividing a second display list into a second plurality of z-bands at a z-order position of the identified occurrence in the second display list, the second plurality of z-bands comprising a reference to the reusable intermediate graphical representation.

7. The method according to claim 1, wherein the reusable intermediate graphical representation is stored in a memory cache for reuse in further display lists, the memory cache having a pre-determined size less than the maximum available memory.

8. The method according to claim 1, wherein the determination of repeated sequences is enabled if the PDL document contains a pre-determined number pages.

9. A system for rendering a page description language (PDL) document, the system comprising:
a memory for storing data and a computer program;
a processor coupled to the memory for executing said program, said program comprising instructions for:
receiving a plurality of display lists, each display list comprising a plurality of display list objects;
determining a repeated sequence of a predetermined number of consecutive display list objects across the display lists;
determining a reusable sequence of display list objects, for the repeated sequence, by extending the repeated sequence to further consecutive display list objects, each occurrence of the reusable sequence being associated with a z-order position in a corresponding display list;
subdividing at least one display list, at the z-order position of the reusable sequence in said display list, into a plurality of z-bands including a reusable z-band for the determined reusable sequence;
generating a reusable intermediate graphical representation for the determined reusable sequence and a further intermediate graphical representation for at least one other z-band;
merging said further intermediate graphical representation with the reusable intermediate graphical representation in accordance with an order of said z-bands; and
rendering the page description language (PDL) document using the merged representations.

10. An apparatus for rendering a page description language (PDL) document, the apparatus comprising:
means for receiving a plurality of display lists, each display list comprising a plurality of display list objects;
means for determining a repeated sequence of a predetermined number of consecutive display list objects across the display lists;
means for determining a reusable sequence of display list objects, for the repeated sequence, by extending the repeated sequence to further consecutive display list objects, each occurrence of the reusable sequence being associated with a z-order position in a corresponding display list;
means for subdividing at least one display list, at the z-order position of the reusable sequence in said display list, into a plurality of z-bands including a reusable z-band for the determined reusable sequence;
means for generating a reusable intermediate graphical representation for the determined reusable sequence and a further intermediate graphical representation for at least one other z-band;
means for merging said further intermediate graphical representation with the reusable intermediate graphical representation in accordance with an order of said z-bands; and
means for rendering the page description language (PDL) document using the merged representations.

11. A non-transitory computer readable medium having a computer program stored thereon for rendering a page description language (PDL) document, the program comprising:
code for receiving a plurality of display lists, each display list comprising a plurality of display list objects;
code for determining a repeated sequence of a predetermined number of consecutive display list objects across the display lists;
code for determining a reusable sequence of display list objects, for the repeated sequence, by extending the repeated sequence to further consecutive display list objects, each occurrence of the reusable sequence being associated with a z-order position in a corresponding display list;
code for subdividing at least one display list, at the z-order position of the reusable sequence in said display list, into a plurality of z-bands including a reusable z-band for the determined reusable sequence;
code for generating a reusable intermediate graphical representation for the determined reusable sequence and a further intermediate graphical representation for at least one other z-band;
code for merging said further intermediate graphical representation with the reusable intermediate graphical representation in accordance with an order of said z-bands; and
code for rendering the page description language (PDL) document using the merged representations.

12. A method for rendering a page description language (PDL) document, the method comprising:
receiving identifying metadata for a first occurrence of a sequence of reusable objects identified in a first display list, a reusable intermediate graphical representation for the sequence of reusable objects being cached for further reuse in a format intermediate between a display list and pixel data;
identifying a second occurrence of the sequence of reusable objects in the PDL document using the received identifying metadata, the identified second occurrence being associated with a z-order position in the PDL document of the second occurrence;
grouping objects of the PDL document into a plurality of z-bands, the plurality of z-bands including a reusable z-band for the identified second occurrence and a further z-band based on the z-order position of the second occurrence;
generating a display list representation for the PDL document, by creating a reference to the cached reusable intermediate graphical representation for the reusable z-band at the z-order position of the identified second occurrence; and generating an intermediate graphical representation to render the PDL document, the intermediate graphical representation being generated by merging the reusable intermediate graphical representation with an intermediate representation for the further z-band using the generated display list representation.

13. The method according to claim 12, wherein occurrences of the sequence of reusable objects are determined on different pages of the document.

14. The method according to claim 12, wherein image data for display list objects is associated with unique identifiers.

15. The method according to claim 12, wherein the display list representation comprises the created reference to the cached reusable intermediate graphical representation.

16. The method according to claim 12, wherein the cached reusable intermediate graphical representation is stored in a memory cache for reuse in further display lists, the memory cache having a pre-determined size less than the maximum available memory.

17. The method according to claim 12, wherein the identification of the second occurrence of the sequence of reusable objects is enabled if the PDL document contains a pre-determined number pages.

\* \* \* \* \*